(12) United States Patent
Brytik et al.

(10) Patent No.: US 11,914,101 B2
(45) Date of Patent: Feb. 27, 2024

(54) METHOD FOR PARTITIONING A SEARCH DIRECTION WHEN USING LEAST SQUARES REVERSE TIME MIGRATION

(71) Applicant: ExxonMobil Technology and Engineering Company, Spring, TX (US)

(72) Inventors: Valeriy V. Brytik, Houston, TX (US); Junzhe Sun, San Jose, CA (US); Carey M. Marcinkovich, The Woodlands, TX (US); Hong Zhao, Houston, TX (US); Erik R. Neumann, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 293 days.

(21) Appl. No.: 17/247,528

(22) Filed: Dec. 15, 2020

(65) Prior Publication Data

US 2021/0239879 A1 Aug. 5, 2021

Related U.S. Application Data

(60) Provisional application No. 62/968,698, filed on Jan. 31, 2020.

(51) Int. Cl.
*G06F 17/18* (2006.01)
*G06F 30/20* (2020.01)
(Continued)

(52) U.S. Cl.
CPC ............ *G01V 99/005* (2013.01); *G06F 17/18* (2013.01); *G06F 30/20* (2020.01); *G06F 30/27* (2020.01); *G06F 2111/10* (2020.01)

(58) Field of Classification Search
CPC ...... G01V 99/005; G01V 1/282; G01V 1/302; G06F 17/18; G06F 30/20; G06F 30/27;
(Continued)

(56) References Cited

U.S. PATENT DOCUMENTS 8,983,779 B2 3/2015 Liu et al.
9,002,651 B2 4/2015 Liu et al.
(Continued)

FOREIGN PATENT DOCUMENTS

WO 2019182564 A1 9/2019

OTHER PUBLICATIONS

Spillane. N. "An Adaptive Multipreconditioned Conjugate Gradient Algorithm" HAL Id: hal-01170059 [retrieved on Nov. 28, 2022] (Year: 2016).*

(Continued)

*Primary Examiner* — Rehana Perveen
*Assistant Examiner* — Alfred H B Wechselberger
(74) *Attorney, Agent, or Firm* — ExxonMobil Technology and Engineering Company—Law Department

(57) ABSTRACT

A method for partitioning a search direction when using least squares reverse time migration (LSRTM) is provided. LSRTM may be used iteratively in order to improve imaging accuracy. As part of LSRTM, multiple local line searches may be performed. In particular, image space may be partitioned, such as by using a set of masks. The search direction, such as the gradient, may be partitioned using the set of masks. Local line searches may be performed for each partition of the search direction, resulting in finding respective line search constants. The respective line search constants may then be used for iterating the model in order to improve imaging accuracy.

19 Claims, 17 Drawing Sheets

(51) Int. Cl.
  *G06F 30/27* (2020.01)
  *G06F 111/10* (2020.01)
  *G01V 99/00* (2009.01)

(58) Field of Classification Search
  CPC .. G06F 2111/00–2119/22; G06F 30/25; G06F 30/28
  See application file for complete search history.

(56) References Cited

U.S. PATENT DOCUMENTS

| | | | |
|---|---|---|---|
| 9,063,248 | B2 | 6/2015 | Liu et al. |
| 9,291,734 | B2 | 3/2016 | Liu et al. |
| 9,291,735 | B2 | 3/2016 | Liu et al. |
| 9,671,512 | B2 | 6/2017 | Sun et al. |
| 9,772,413 | B2 | 9/2017 | Krohn et al. |
| 10,088,588 | B2 | 10/2018 | Zhang et al. |
| 10,191,168 | B2 | 1/2019 | Peng et al. |
| 10,295,683 | B2 | 5/2019 | Du et al. |
| 10,324,207 | B2 | 6/2019 | Khalil et al. |
| 10,436,927 | B2 | 10/2019 | Sun et al. |
| 10,520,619 | B2 | 12/2019 | Yang et al. |
| 10,670,751 | B2 | 6/2020 | Qin et al. |
| 10,725,190 | B2 | 6/2020 | Gratacos et al. |
| 10,739,478 | B2 | 8/2020 | Coates et al. |
| 2012/0051180 | A1 | 3/2012 | Shin |
| 2013/0185032 | A1 | 7/2013 | Archer et al. |
| 2013/0311149 | A1* | 11/2013 | Tang ................. G06F 30/00 703/2 |
| 2015/0293246 | A1 | 10/2015 | Dickens et al. |
| 2017/0176613 | A1 | 6/2017 | Burnett et al. |
| 2018/0045839 | A1 | 2/2018 | Tang et al. |
| 2018/0156931 | A1 | 6/2018 | Ahmed |
| 2018/0156933 | A1 | 6/2018 | Ahmed |
| 2018/0275302 | A1 | 9/2018 | Calderon et al. |
| 2019/0302293 | A1 | 10/2019 | Zhang et al. |
| 2021/0215824 | A1* | 7/2021 | Bai ................. G01V 1/301 |

OTHER PUBLICATIONS

Ihlenburg, F. "Finite Element Analysis of Acoustic Scattering" Chapter 4 [retrieved on Nov. 27, 2022] (Year: 1998).*

Melenk, J. "On Generalized Finite Element Methods" [thesis] University of Maryland [retrieved on Nov. 27, 2022] (Year: 1995).*

Tang, Y. "Imaging and Velocity Analysis by Target-Oriented Wavefield Inversion" [thesis] Stanford University [retrieved on Nov. 27, 2022] (Year: 2011).*

Zargham et al. "Accelerated Dual Descent for Network Flow Optimization" IEEE Transactions on Automatic Control, vol. 59, No. 4, Apr. 2014 [retrieved on Nov. 26, 2022] (Year: 2014).*

Schuster, G. T. (2017) "Seismic Inversion," Chapter 15: Interative Least-Squares Migration, Investigations in Geophysics, No. 20, pp. 177-195, ISBN-13: 978-1560803416.

Shewchuk, J. R. (1994) "An introduction to the Conjugate Gradient Method without the Agonizing Pain Edition 1 1/4" School of Computer Science, Carnegie Mellon University, Pittsburgh, PA, Aug. 4, 1994 (64pgs).

* cited by examiner

METHOD FOR PARTITIONING A SEARCH DIRECTION WHEN USING LEAST SQUARES REVERSE TIME MIGRATION

CROSS REFERENCE TO RELATED APPLICATION

This application claims the benefit of priority of U.S. Provisional Application No. 62/968,698, filed Jan. 31, 2020, the disclosure of which is incorporated herein by reference in its entirety.

TECHNICAL FIELD

The technical field relates to geophysical prospecting, such as geophysical data processing used for prospecting. More specifically, the technical field relates to a method for partitioning a search direction when using least squares reverse time migration.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

One goal of seismic prospecting is to accurately image subsurface structures, commonly referred to as reflectors. Seismic prospecting is facilitated by performing a seismic survey in order to obtain seismic data. In particular, seismic energy may be generated at ground or sea level by, for example, a controlled explosion (or other type of source, such as vibrators), and delivered to the Earth. Seismic waves are reflected from underground structures and are received by various sensors/receivers, such as geophones. The seismic data received by the geophones is then processed in order to create an accurate mapping of the underground environment. The processed data may thereafter be examined with a goal of identifying geological formations that may contain hydrocarbons (e.g., oil and/or natural gas).

Various imaging tools may be used for seismic processing. For example, Gerard T. Schuster, Seismic inversion, Investigations in Geophysics No. 20, ISBN-13: 978-1560803416, (2017) discloses various implementations of least squares migration (LSM). See also U.S. Pat. No. 9,772,413, incorporated by reference herein in its entirety. In particular, LSM may be implemented in different ways, including for reverse time migration (RTM) and diffraction-stack migration. Typically, diffraction-stack migration provides images with fewer artifacts. In contrast, RTM automatically generates upgoing reflections from reflectors, so residuals may also be smeared giving rise to unwanted migration artifacts. These artifacts may be avoided by using a smooth model for the migration velocity and by eliminating the diving and direct waves. One implementation of RTM comprises least squares reverse time migration (LSRTM), which may be implemented in the data domain or in the image domain.

1. Data Domain (DD) LSRTM

DD LSRTM is implemented via iterative inversion using gradient optimization methods. Various methods of preconditioning may be applied in the image and/or data domains. Example methods of gradient preconditioning include PSF and NMF filters mentioned above. Each LSRTM iteration is computationally intensive, at roughly 1.5 RTM cost. Even after proper preconditioning, it may take roughly 6-7 iterations for LSRTM to achieve reasonable results (i.e., converge), which makes it computationally expensive and sometimes not feasible.

FIG. 11A illustrates a flow diagram 1100 for DD LSRTM. In particular, DD LSRTM aims to minimize the least-squares misfit between recorded data and predicted data by iteratively updating the reflectivity model. In particular, at 1104, in a first iteration, the predicted data ($d_0$) is set to zero, and the difference ($r_0$) between the recorded data (input from 1102) and the predicted data is calculated. At 1106, the data residual is calculated ($r_{i+1}=r_i-\alpha_i \Delta r$), with a line search being performed to find the appropriate $\alpha_i$. Migration (at 1108) and demigration (at 1110) are performed iteratively, as shown in FIG. 11A.

In this way, a linear inversion is performed in that the location of reflectors are fixed throughout iterations. Data domain LSRTM results in typically stable and robust, potentially may produce the best result; however, the computation cost may be expensive (e.g., multiple RTMs) but may be mitigated by random shot selection. The following equations illustrate the data domain least-squares migration iteration:

The original problem is shown as solving the following equation:

$$Lm=d.$$

Viewing the above as a least-squares problem leads to the following formulation:

Solving for $m$ in $L^T L m = L^T d$, where d: data; m: image; L: demigration; and $L^T$: migration.

For one iteration (using the steepest descent method), the following is performed:

Calculate gradient: $g_i = L^T(Lm_i - d)$

Precondition gradient: $\hat{g}_i = C g_i$

Line search: $\alpha_i = \langle L\hat{g}_i, d-Lm_i \rangle / \langle L\hat{g}_i, L\hat{g}_i \rangle$ Update image: $m_{i+1} = m_i + \alpha_i \hat{g}_i$ When using the steepest descent method, in practice, only $\hat{g}_i$ is demigrated and remigrated, so the cost per iteration is one migration plus one demigration.

2. Image Domain (ID) LSRTM

ID LSRTM is based on various approaches of finding an approximation to the Hessian. Example approximations include, but are not restricted to, Point Spread Functions (PSF) (Hessian estimated on distinct point diffractors) or non-stationary matching filters (NMF) (Hessian estimated on the structural image itself). The approximate cost of both methods is equivalent to two RTM runs. Both methods may suffer from the band-limited nature of the filters. Thus, PSF may be sensitive to placement of the point diffractors. Both PSF and NMF are sensitive to the numerical noise. It may also be difficult to evaluate if the result of applying image domain filters is reliable.

FIG. 11B illustrates a flow diagram 1150 of a single iteration ID LSRTM. Point diffractors (at 1152) are used for migration (at 1154). Demigration (at 1158) and migration (at 1152) are used to generate output (at 1160). In this way, FIG. 11B illustrates an approximate image domain LSRTM by extracting the impulse response of the Hessian operator, i.e., point spread functions, and deconvolve them from the RTM image. The methodology illustrated in FIG. 11B is inexpensive computationally, but may be prone to stability issues (e.g., deconvolution/division by zero) and may have limited resolution uplift.

In a specific implementation representing only acoustic smooth media, LSRTM may be implemented by solving the wave equation for three types of right hand sides (RHSs). The first type has the time history of the actual sources F(x, t) on the RHS so that the solution to Source Term $$\nabla^2 D(x,t)_o - s(x)_o^2 \ddot{D}(x,t)_o = F(x,t) \tag{1}$$

gives the "downgoing" field $D(x, t)_o$ in the smooth slowness model denoted by $s(x)_o$. The equation $(\nabla^z - s(x)_o^2 \partial^2/\partial t^2)D(x, t)_o = F(x, t)$ is symbolized by $\mathcal{L}[D_o] = F$ and its solution is $D_o = \mathcal{L}^{-1}[F]$.

The second type of wave equation is where the RHS time history is given by $\ddot{D}(x, t)_o$ and the source strength is $-2s(x)_o \delta s(x)$ Exploding Reflectors $$\nabla^2 U(x,t) - s(x)_o^2 \ddot{U}(x,t) = -2s(x)_o \delta s(x)^{(k)} \ddot{D}(x,t)_o, \tag{2}$$

where the solution in equation (2), compactly represented as $\mathcal{L}^{-1}[-2s(x)_o \delta s(x)^{(k)} \ddot{D}(x,t)_o]$, is the upgoing scattered filed $U(x, t)^{(k)}$ emanating from the exploding reflectors. Each explosion is initiated by the downgoing field $\ddot{D}(x, t)_o$ when it encounters a non-zero slowness perturbation $\delta s(x)^{(k)}$. Note that the iteration index k is denoted as a superscript.

The third type of solution corresponds to the backward extrapolation of the residual wavefield $\Delta r(g, t)$ for g on the recording surface to obtain the upgoing residual wavefield $\Delta r(x, t)$ at depth. Here, one assumes a single shot gather so that the index for the shot is silent. In this case, the residual traces $\Delta r(g, t)$ at the surface act as virtual sources so that the residual wavefield at depth may be compactly expressed as:

$$\Delta r(x,t) = \hat{\mathcal{L}}^{-1}[\Delta r(g,t)], \tag{3}$$

where the hat in equation (3) denotes that the solution of the wave equation is computed by temporally marching the self-adjoint finite difference code backward from the final time in the recorded traces to zero time. If the governing equation is not self-adjoint, i.e., $\mathcal{L} \neq \mathcal{L}^\dagger$, then the adjoint wave equation is used to extrapolate the residuals.

To begin the LSM iterations, the direct and diving waves are first muted (or adaptively subtracted) from the data and the result is migrated to obtain an estimate of the starting slowness perturbation $\delta s(x)^{(0)}$. To avoid rabbit-ear artifacts in the migration image, the forward and back propagation operations employ the smooth background slowness $s(x)_o$. The source wavelet is estimated from the data and traces are normalized to a maximum value of 1; otherwise, there will be non-zero residuals due to the mismatch between the predicted and observed wavelets.

In practice, the LSRTM image is iteratively computed by a preconditioned conjugate gradient or Quasi-Newton method. For simplicity, the following pseudocode describes a preconditioned steepest descent method for a single shot gather:

Estimate $s(x)_0$, w(t) and C Estimate smooth slowness model, source wavelet & diagonal preconditioner C.

Compute $D = \mathcal{L}^{-1}[F]$ Solve equation (1) with slowness model s(x)o.

$\delta s(x) \leftarrow \Sigma_t p^{obs}(x, t)D(x, t)$ Migrate recorded reflection data $p^{obs}(g, t)$ $p^{obs}(x, t)$ is the backward extrapolated data for k=0: K Start LSM iterations.

pp(g, t)← $\mathcal{L}^{-1}[-2s(x)_o \delta s(x) \ddot{D}(x, t)_o]$ Predict reflection data with eq. (2).

$\Delta r(g, t) = pp(g,t) - p(g,t)^{obs}$ Compute residual at geophones.

Stop if $\frac{\|\Delta r\|_2}{\|U^{obs}\|_2} < \epsilon$ $\Delta r(x, t) = \hat{\mathcal{L}}^{-1}[\Delta r(g, t)]$ Backpropagate residual in reverse time.

$\gamma(x) \leftarrow -2s(x)_0 \Sigma_t \Delta r(x, t)D(x, t)$ Migrate residual & compute step length alpha.

$\delta s(x) = \delta s(x) - \alpha C(x)\gamma(x)$ Update slowness perturbation.
End.

Various line searches may be performed. As one example, an exact line search may be performed. Specifically, the 1D line search problem may be defined as finding the optimal value of the scalar a that minimizes $f(x+\alpha\Delta x)$ for a fixed x and $\Delta x$, which may be represented as:

$$f(x + \alpha\Delta x) \approx f(x) + \alpha g^T \Delta x + \frac{\alpha^2}{2} \Delta x^T H \Delta x \tag{4}$$

Differentiating the above equation with respect to a, and setting the result equal to zero yields:

$$\frac{\partial f(x + \alpha\Delta x)}{\partial \alpha} + = g^T \Delta x + \alpha \Delta x^T H \Delta x, = 0 \tag{5}$$

Solving for the optimal $\alpha^*$ gives:

$$\alpha^* = \frac{-g^T \Delta x}{\Delta x^T H \Delta x}, \tag{6}$$

the exact step length. This method may be termed an exact line search because the step length formula in equation (6) is exactly correct if f(x) is a quadratic functional. For the steepest descent method, $\Delta x = -g$ so that $$\alpha^* = \frac{g^T g}{g^T H g}. \tag{7}$$

In practical seismic inverse problems such as non-linear full waveform inversion, the exact line search typically never works well so a numerical line search method is used instead.

Thus, Reverse Time Migration (RTM) and Seismic Inversion (e.g., Least Square Reverse Time Migration (LSRTM)) may assist with seismic processing, particularly in the complex geologic regions. Computationally expensive elements of these tools are forward-modeling (e.g., modeling full seismic wave field) and image creation or gradient estimation (e.g., using RTM or LSRTM).

SUMMARY

In one implementation, a computer-implemented method is disclosed, including: computing, using at least one computer and a subsurface property model, an objective function measuring misfit between model-simulated data and measured geophysical data; computing, using the at least one computer, a search direction in order to update the model; partitioning the search direction; performing multiple line searches for the partitioned search direction in order to generate respective line search constants; and updating the model using the partitioned search direction and the respective line search constants.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION

Figure 1:
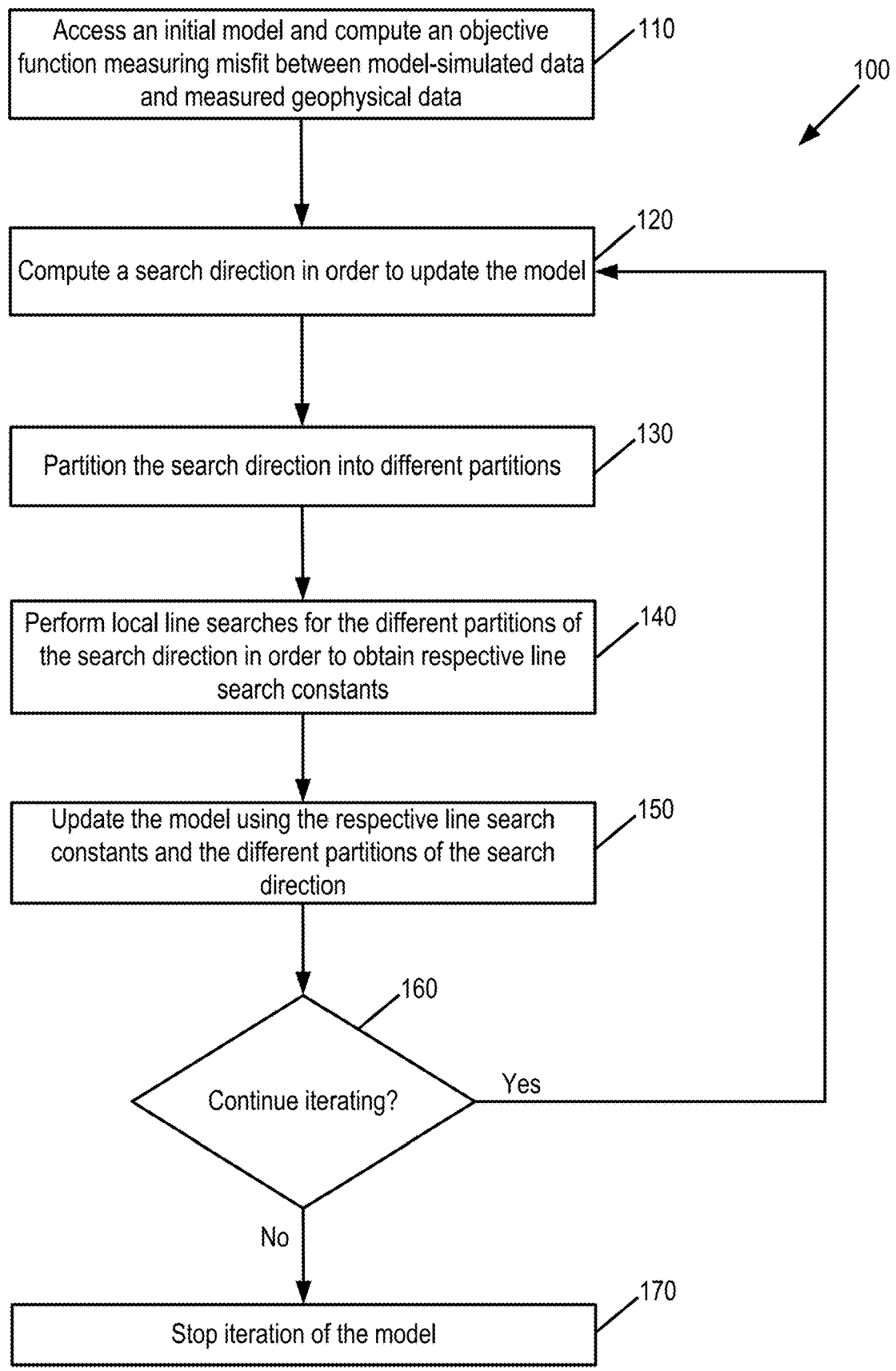
FIG. 1 illustrates a flow diagram for partitioning the search direction and performing local line searches of the partitioned search direction in order to obtain different search constants.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data (e.g. seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

If there is any conflict in the usages of a word or term in this specification and one or more patent or other documents that may be incorporated herein by reference, the definitions that are consistent with this specification should be adopted for the purposes of understanding this disclosure.

As discussed in the background, in standard DD LSRTM, the Line Search is performed, such as with random shot selection. Even with nearly correct preconditioning, DD LSRTM may still be inefficient. In particular, due to the somewhat "unpredictable" behavior of the real data, the image updates may require substantially different scaling of the search direction (e.g., in the specific example of steepest descent, simply the gradient) during the Line Search procedure.

To improve LSRTM (whether in the data domain or image domain), in one implementation, multiple line searches may be performed in order to obtain respective line search constants. For example, in a specific implementation, the search direction (such as the gradient) may be partitioned (such as by using masks for a partition of unity). Respective line searches may then be performed for the partitioned search direction in order to generate respective line search constants, with the model update using the partitioned gradient and respective line search constants.

This is unlike other LSRTM, which may perform a single line search in order to obtain a single scaling search constant. In particular, using one single scaling from the Line Search procedure may increase the number of the required iterations for convergence, thereby resulting in increased computational cost. In contrast, in one implementation, the Line Search procedure performs multiple line searches to generate multiple scaling constants, potentially reducing the number of required LSRTM iterations (e.g., LSRTM iterative inversion) for convergence without substantial change in the computational cost, thus reduce computational cost overall. Alternatively, or in addition, the same methodology may be applied to other applications, such as Born-approximation based implementations of tomographically-enhanced Full Wavefield Inversion (FWI) (see US Patent Application Publication No. 2017/0176613 and US Patent Application Publication No. 2018/0045839, both of which are incorporated by reference herein in their entirety).

In one implementation, inversion may focus on operating eigenvalue by eigenvalue (in effect, piece by piece of the image). If a specific eigenvalue is dominating, inversion concentrates on that specific eigenvalue. However, in real images, one may be interested in improving a section of the image that does not include the largest deflection (e.g., the section of the image may contain a small blip, which is nonetheless important). By splitting the image into different pieces or sections, inversion may focus on several prospects simultaneously, such as different areas of the image, without losing accuracy, while potentially reducing the number of iterations necessary for convergence.

Partitioning of the search direction (such as partitioning of the gradient) may be based on the linearity of LSRTM. In particular, there may be no a priori interaction between the strengths of the updates for different parts of the image. As such, the line search step may adjust magnitudes in different parts of the subsurface (which may be partitioned, with respective line searches performed in the respective different parts of the subsurface). It is akin to transforming linear problem Lx=b into similar problem $$\begin{pmatrix} L_1 & 0 \\ 0 & L_2 \end{pmatrix} \begin{pmatrix} x_1 \\ x_2 \end{pmatrix} = \begin{pmatrix} b_1 \\ b_2 \end{pmatrix}$$

where L is a diagonal matrix, and perform separate line searches for the partial problems $L_1 x_1 = b_1$ and $L_2 x_2 = b_2$.

In one implementation, the magnitudes (e.g., different $\alpha$) for the Line Search step may be adjusted independently and simultaneously. Alternatively, at least some of the search constants for the magnitudes for the Line Search step may be adjusted dependently and/or simultaneously. As one example, one or more of the respective search constants ($\alpha$) may be modified (such as smoothed) based on other positionally proximate search constants. In this regard, in one implementation, a may be subject to a smoothing variable.

Further, the partition of the search direction may be performed in one of several ways. In one way, masks may be used to partition the search direction into different sub-domains. In another way, the search direction may be partitioned based on spatial frequency (e.g., dip of the reflectors) in order to split the search direction into different parts. An example of analysis of dip of the reflectors is disclosed in U.S. Pat. No. 9,671,512, incorporated by reference herein in its entirety. Other ways of partitioning the search direction are contemplated.

Thus, in one implementation, a first type of partitioning, such as via masks, may be used. In a second implementation, a second type of partitioning, such as via spatial frequency (e.g., 3D spatial analysis), may be used. In still another implementation, different types of partitioning may be used to partition a single image, such as partitioning based on masks and based on spatial frequency. In this way, the partitions may result in the subsurface being effectively divided in 3D space. For example, masks may be used for a first partition may comprise depths from 1 km-2 km and a second partition may comprise depths from 2 km-4 km, and spatial distribution analysis is used to partition at greater depths. In this way, with assumed linearity, the subsurface image may be partitioned in any manner, such as at any one, any combination, or all of: the point level; the surface level; or the volume level.

Further, one or more partitions may be used in the process of updating the model. In one implementation, the same partitions (e.g., the same masks) may be used for partitioning the search direction (in order to perform the line searches) as may be used to update the model. In an alternate implementation, different partitions (e.g., different sets of masks) may be used for partitioning the search direction and for updating the model. For example, the set of masks for partitioning the gradient, which is used to perform the local line searches, may be wider or larger than the set of masks used to update the model. In particular, the masks used to update the model may conform to the partition of unity, whereas the masks for partitioning the gradient do not conform to the partition of unity. In practice, using the wider masks for the partitioning of the gradient may decrease mask imprint and unwanted scars for the updated model. In this regard, different masks may be used for the line search than for the final update of the model.

Further, the number of partitions may be selected dynamically or may be predetermined. As discussed above, various parts of the image may have different events. Due to the linearity (or near linearity) of the events to the underlying data, the image may be divided or partitioned into different sections, with the line searches (and the resulting line search constants) for the different sections of the image being used to improve the respective sections.

For example, an image may have two events which may cross-cut one another, with a first event being a "true" event (e.g., a fault line) and a second event being a "false" event (e.g., an artifact in the image resulting from noise). The image may be partitioned so that a first line search may be performed on the first section of the image associated with the first event in order to generate a first line search constant (e.g., generating a first line search constant of 5 in order to enhance the "true" event in the first partition) and so that a second line search may be performed on the second section of the image associated with the second event in order to generate a second line search constant (e.g., generating a second line search constant of nearly 0 in order to de-emphasize the 'false' event in the second partition). Otherwise, without the separate local line searches, the "true" event may not be emphasized sufficiently while the "false" event may not be de-emphasized sufficiently).

In one implementation, the number of partitions may be dynamically determined. For example, the current iteration of the image of the subsurface may be analyzed, with the analysis determining the number of partitions. In particular, the analysis may identify one or more events in the image. The number of partitions may be based on the number of events (e.g., a partition of the subsurface for each identified event and a remainder of the subsurface not including an event being a final partition). By way of example, in one image, there may be four areas of interest, resulting in four partitions, whereas in another image, there may be six areas of interest, resulting in six partitions.

In a more specific implementation, the number of partitions may be dynamically determined for different iterations. For example, a first image in a first iteration may be analyzed to identify X number of events, and to partition the first image accordingly based on the identified X number of events. Thereafter, a second image in a second iteration may be analyzed to identify Y number of events (where X is different from Y), and to partition the second image accordingly based on the identified Y number of events.

Alternatively, the number of partitions does not vary between iterations. For example, when using the conjugate gradient algorithm, which relies on gradients for different iterations, the number of partitions remains constant between the iterations.

Further, as discussed in the background, line searches may be used in a variety of contexts. For example, in FWI, the inversion may be implemented as a combination of inner and outer inversions. In one implementation, the outer loop inversion is mostly responsible for the low frequency velocity updates and the inner loop inversion is responsible for the high frequency impedance/reflectivity updates. The inner loop objective function is quadratic whereas the outer loop inversion is non-linear. In this regard, in a specific implementation, multiple line searches may be performed in an operation, such as FWI. Thus, in a same operation (such as for an FWI operation), partitioning the search direction and performing local line searches for the partitioned search direction may be used where the objective function is linear (such as for line searches for the inner loop object function), whereas the traditional (non-partitioned) single line search (with an unpartitioned search direction) is used where the objective function is non-linear (such as for line searches for the outer loop inversion).

Referring to the figures, FIG. 1 illustrates a flow diagram 100 for partitioning the search direction and performing local line searches of the partitioned search direction in order to obtain respective (and potentially different) search constants. At 110, an initial model is accessed and, from which, an objective function is computed measuring misfit between model-simulated data and measured geophysical data. In this regard, an initial model may be generated. For example, with inversion-based seismic imaging algorithms, also known as waveform inversion, the subsurface model may be iteratively updated to reduce data misfit defined by a certain objective function. In this regard, an initial subsurface model may be generated and iteratively updated.

At 120, a search direction is computed in order to update the model. As discussed above, determining a search direction (such as a gradient) may be used in order to perform line searches. Different methodologies are contemplated for computing the search direction. As one example, the conjugate gradient algorithm may be used in order to determine the search direction based on gradients computed in the current and previous iterations. As another example, the steepest descent method may use the gradient computed in the current iteration.

At 130, the search direction (such as the gradient) is partitioned into different partitions. As discussed in more detail below, various ways of partitioning the search direction are contemplated. At 140, local line searches are performed for each of the different partitions of the search direction in order to obtain respective line search constants. At 150, the model is updated using the different partitions of the search direction and the respective line search constants.

At 160, it is determined whether to continue iteration. As one example, iteration continues if the updated model has not sufficiently converged (e.g., the simulated seismic data generated from the updated model is significantly different from the actual seismic data). If so, flow diagram 100 loops back to 120. If not, at 170, iteration of the model is stopped.

Figure 2A:
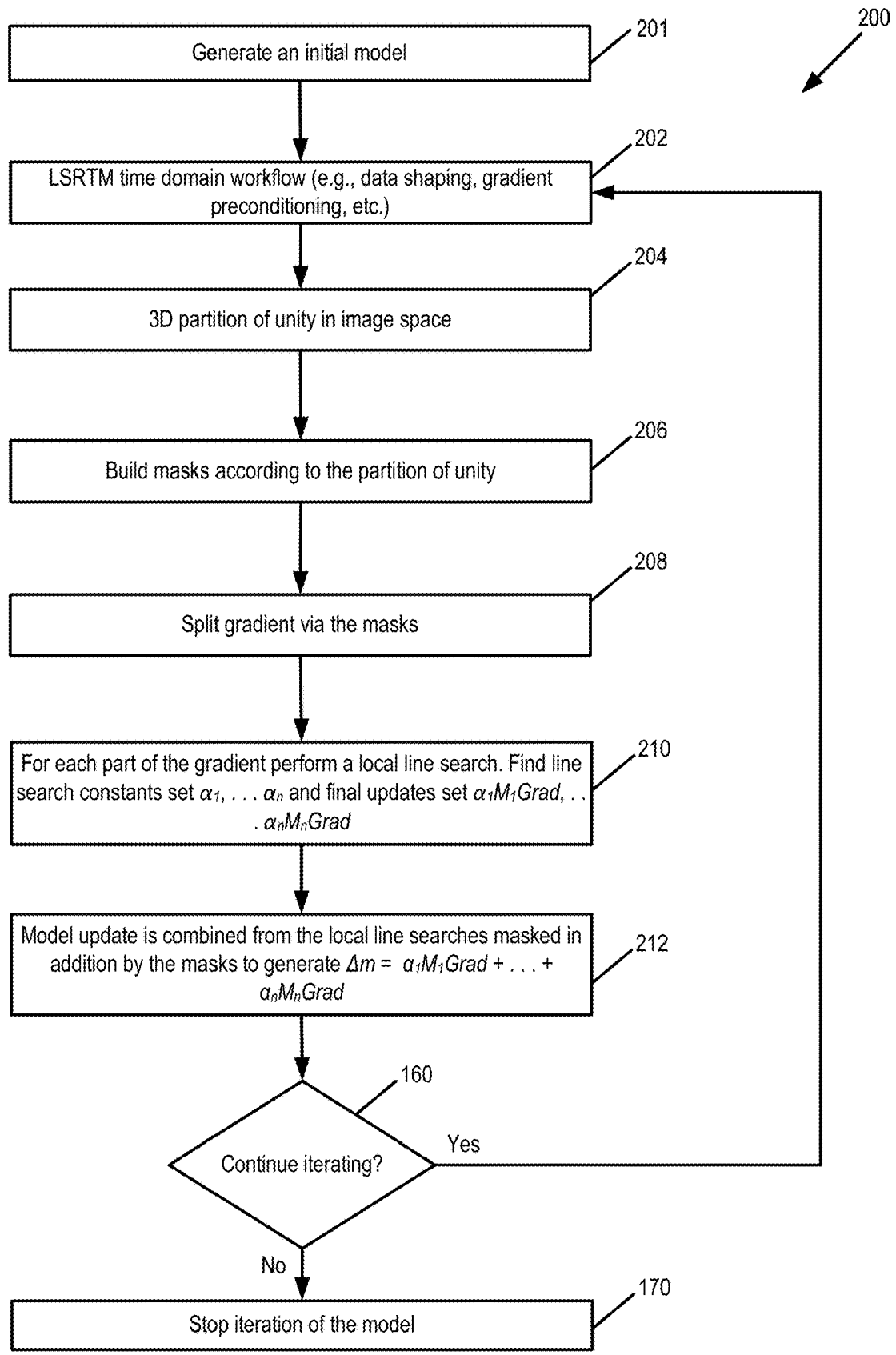
FIG. 2A illustrates a first example flow diagram partitioning the gradient and performing local line searches of the partitioned gradient in order to obtain different search constants.
Figure 6A:
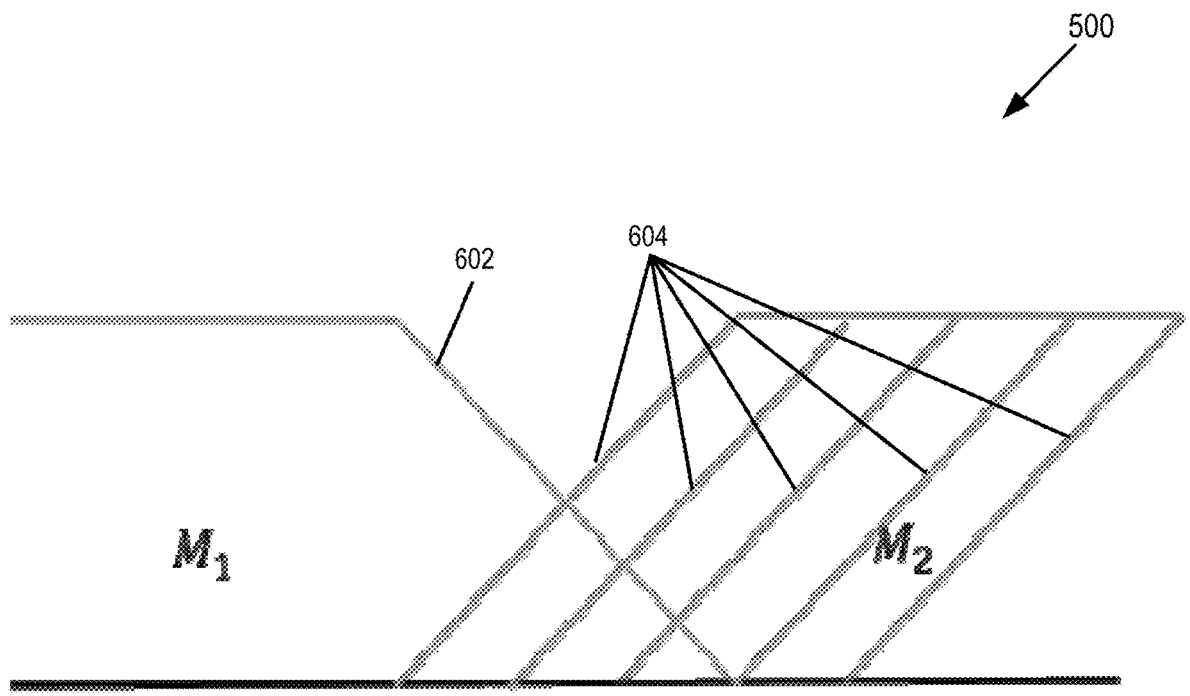
FIG. 6A shows an illustration of masks for partitioning the gradient.

FIG. 2A illustrates a first example flow diagram 200 partitioning the gradient and performing local line searches of the partitioned gradient in order to obtain respective search constants. After generating an initial model at 201, a LSRTM time domain workflow may be performed at 202. Various operations are contemplated in the LSRTM time domain workflow including any one, any combination, or all of: data shaping, gradient shaping, or the like. At 204, a 3D partition of unity in image space (e.g., x, y, z) is introduced. An example of this is illustrated by the lines 602, 604 in FIG. 6A, which shows an illustration 600 of masks for partitioning the gradient. At 206, masks are built corresponding to the partition of unity (such as illustrated by the lines 602 (representing mask $M_1$) and 604 (representing mask $M_2$) in FIG. 6A). The masks may comprise a set of masks (e.g., masks set #1) and may comprise Masks $M_1, \ldots M_n$. At 208, the gradient is split or partitioned via the masks (e.g., masks set #1) resulting in the following partitioned gradient: $M_1$Grad, $\ldots$ $M_n$Grad.

Figure 6B:
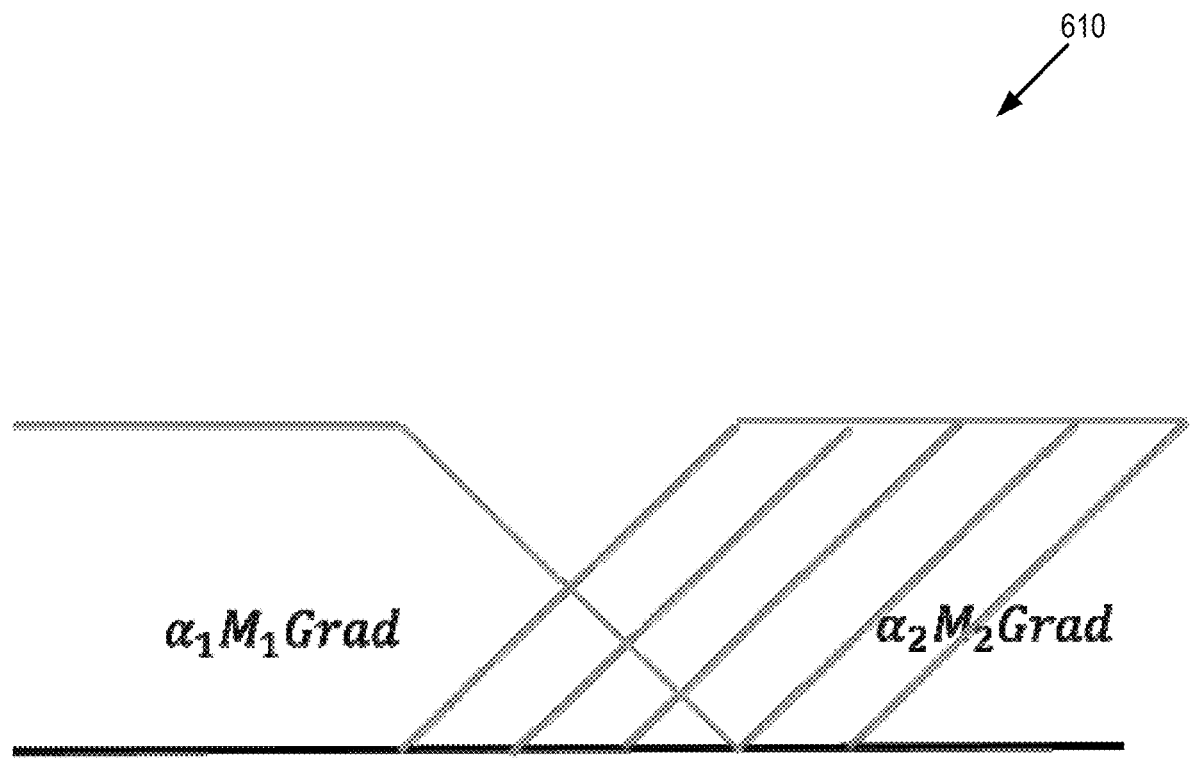
FIG. 6B shows an illustration of weighted partitioned gradients of the masks illustrated in FIG. 6A.

At 210, for each part of the gradient (e.g., $M_1$Grad, $\ldots$ $M_n$Grad), a local line search is performed. Each respective local line search results in a respective line search constant, so that a set of respective line search constants is obtained. For example, the line search constants set $\alpha_1, \ldots \alpha_n$ is obtained, with the final updates set being $\alpha_1 M_1$Grad, $\ldots$ $\alpha_n M_n$Grad. This is represented by FIG. 6B, which shows an illustration 610 of weighted partitioned gradients ($\alpha_1 M_1$Grad, $\alpha_2 M_2$Grad) of the masks illustrated in FIG. 6A. At 212, the model update is combined from the local line searches masked in addition by the respective mask from masks set #1. For example, the model update comprises $\Delta m = \alpha_1 M_1$Grad$+ \ldots +\alpha_n M_n$Grad.

Figure 2B:
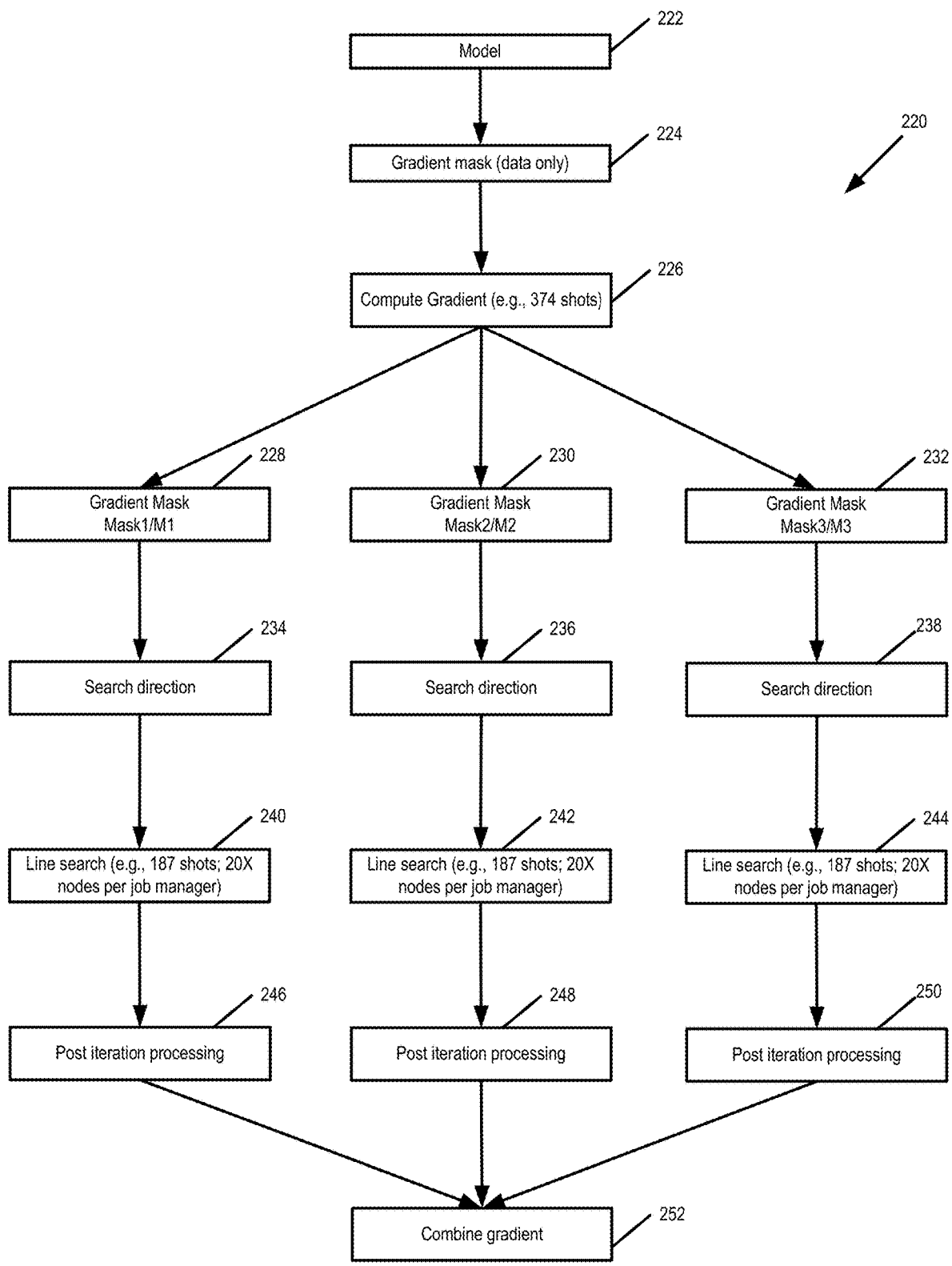
FIG. 2B illustrates a second example flow diagram partitioning the gradient and performing local line searches of the partitioned gradient in order to obtain different search constants.

FIG. 2B illustrates a second example flow diagram 220 partitioning the gradient and performing local line searches of the partitioned gradient in order to obtain respective search constants. At 222, the model is accessed. At 224, the gradient masks is accessed. At 226, the gradient is computed. As shown in FIG. 2B, three gradient masks are used, including gradient mask1/M1 (228), gradient mask2/M2

(230), and gradient mask3/M3 (232), in order to partition the gradient into respective search directions 234, 236, 238. Optionally, preconditioning may be performed before and/or after blocks 228, 230, 232. Further, FIG. 2B may be used with various optimization methods, such as with conjugate gradient. In this instance, the masks are not changed between iterations. Alternatively, a simpler optimization method, such as steepest descent, may be used. In that instance, flow diagram 220 may be changed by omitting blocks 228, 230 and 232, and the masks may be changed between iterations.

Local line searches are performed at 240, 242, 244 for the partitioned search directions 234, 236, 238, respectively, in order to generate the respective line search constants, which may be used as-is, or may be smoothed across the region boundaries. Further, post iteration processing may be performed at 246, 248, 250. After which, at 252, the gradient is combined. In this way, FIG. 2B illustrates an LSRTM workflow, which may include data shaping and/or gradient preconditioning. Analysis of the image may extract one or more wavelets in the area of interest, with a shaping filter derived to match with the log spectrum. Thereafter, the search direction (e.g., gradient) may be partitioned via masks described in XYZ space, with the masks honoring the partition of unity. After which, a plurality of local line searches may be performed, with the model update being combined from the local line searches.

Figure 3:
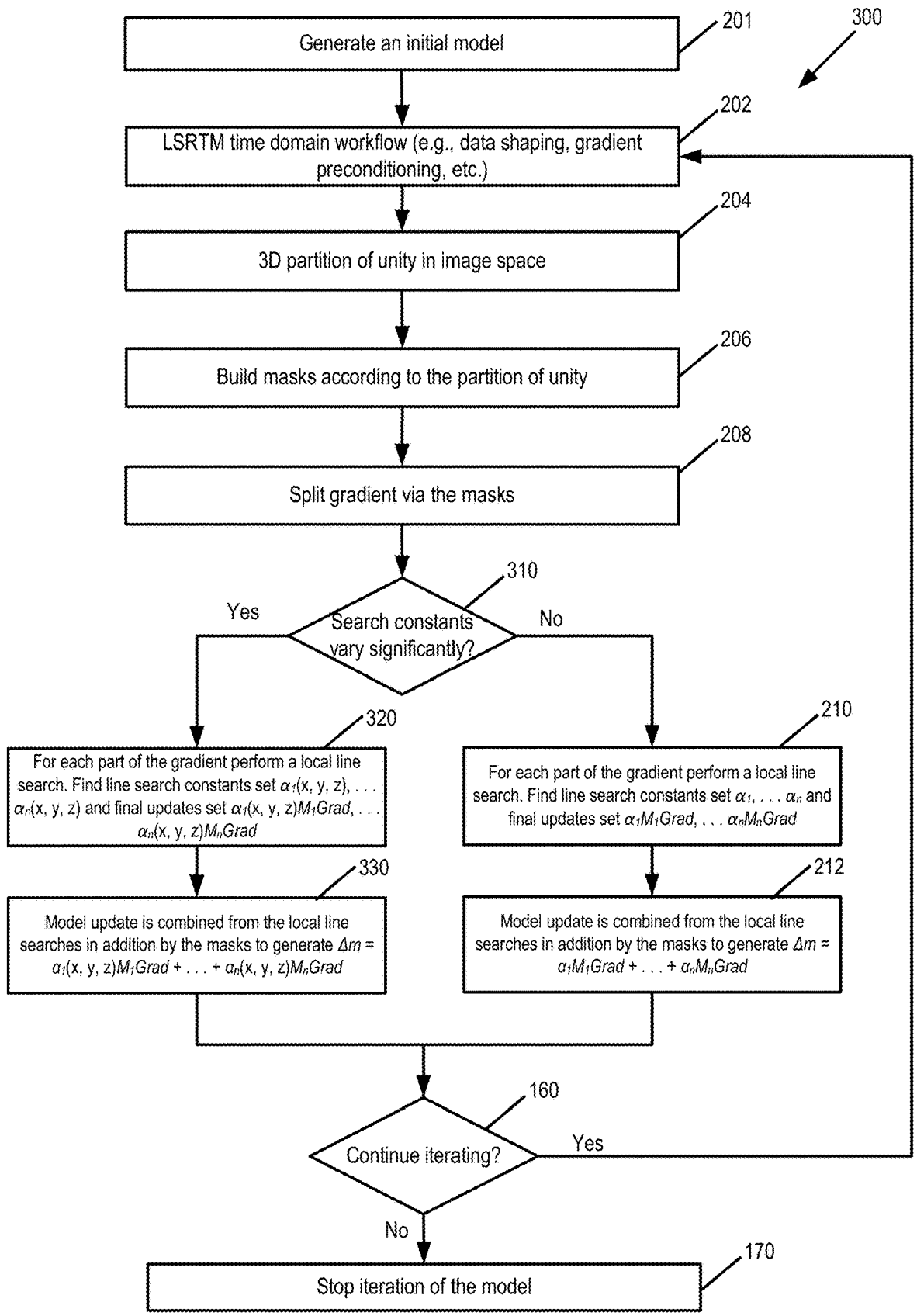
FIG. 3 illustrates a third example flow diagram partitioning the gradient and performing local line searches of the partitioned gradient in order to obtain different search constants, whereby the search constants are interpolated.

FIG. 3 illustrates a third example flow diagram 300 partitioning the gradient and performing local line searches of the partitioned gradient in order to obtain respective search constants, whereby the search constants are interpolated. As discussed above, a respective line search constant resulting from a respective line search may thereafter be used without regard to other line search constant(s) resulting from other line search(es).

Alternatively, line search constants may be modified prior to use in updating the model. In one implementation, the line search constants may be modified based on one or more other line search constants. For example, a specific line search constant may be modified based on line search constant(s) associated with a section (or sections) of the image that is adjacent to the section of the image associated with the specific line search constant.

Figure 6C:
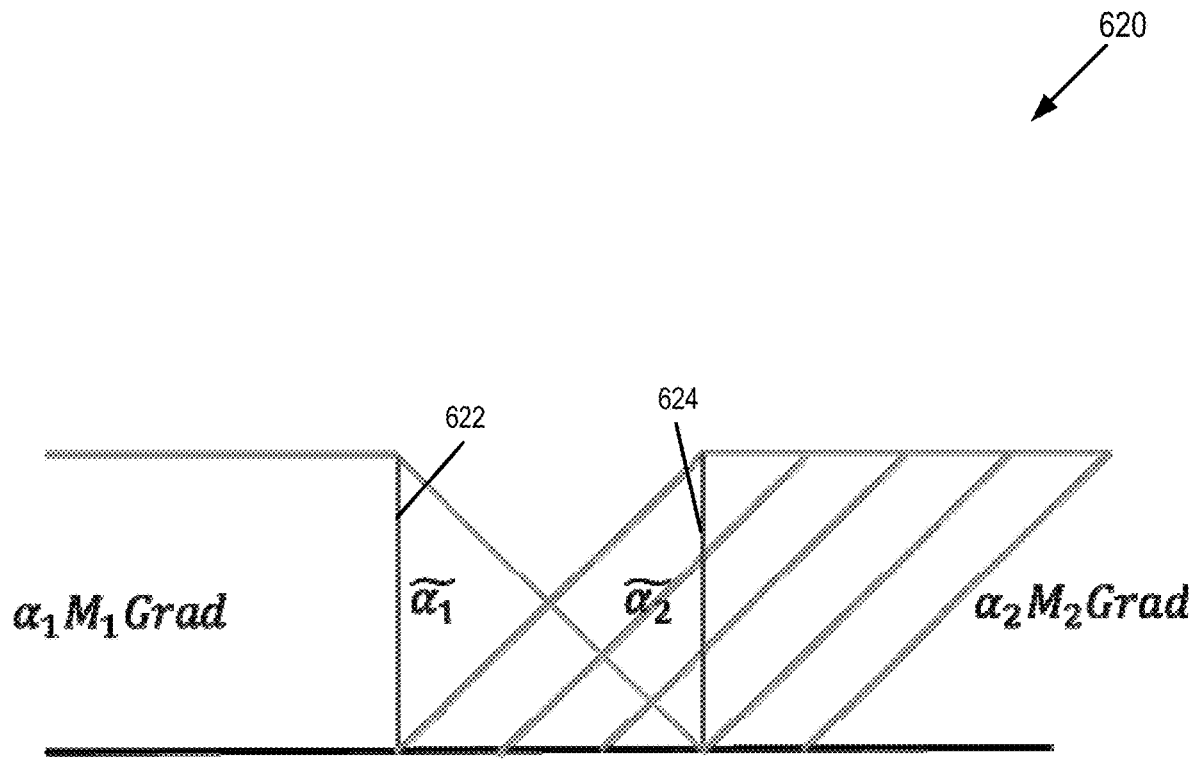
FIG. 6C shows an illustration of partitioned gradients with interpolated weights for the masks illustrated in FIG. 6A.

As discussed above, the partitioning may result in the subsurface being partitioned into different respective sections (such as a plurality of 3D subsections). Respective local line searches may be performed for the respective sections, resulting in respective line search constants for the respective sections. In practice, the variation of the line search constants (e.g., one or more respective a) might be substantial. In such a situation, interpolation may be used. For example, in a region that overlaps the two adjacent sections, interpolation may be performed in order to smooth transition of the line search constant from one adjacent section to a second adjacent section. An example of an overlap region is illustrated in FIG. 6C between lines 622 and 624, which shows an illustration 620 of partitioned gradients with interpolated weights for the masks illustrated in FIG. 6A. Other examples of overlap regions are contemplated. For purposes of explanation, a first respective section may have a respective line search constant ($\alpha_1$)=1 and a second respective section may have a respective line search constant ($\alpha_2$)=2. Thus, the values for a may vary in 3D space in order to transition between the value for $\alpha_1$ and $\alpha_2$, such as from the region that overlaps the two adjacent sections has values for a of 1.1, 1.2, 1.3, 1.4, 1.5, 1.6, 1.7, 1.8, 1.9. The size of the region that overlaps the two adjacent sections may comprise a predetermined percentage of each respective section (e.g., 10% of each respective section, 20% of each respective section, etc.). Further, in practice, interpolation may be performed from the center of the 3D subsurface outward toward the edges of the 3D subsurface.

Thus, instead of having respective line search constants (a) being independent of location in the subsurface (see 210 $\alpha_1 M_1 Grad, \ldots \alpha_n M_n Grad$), the respective line search constants (a) may be dependent on location in the subsurface (see 320 $\alpha_1(x, y, z)M_1 Grad, \ldots \alpha_n(x, y, z)M_n Grad$). Referring back to flow diagram 300, at 310, it is determined whether the search constants vary significantly. If not, the flow is as taught in FIG. 2A. If the $\alpha^s$ changes drastically, one may smooth them using specially varying as(x, y, z). For example, at 320, for each part of the gradient (e.g., $M_1 Grad, \ldots M_n Grad$), a local line search is performed. Each respective local line search results in a respective line search constant, so that a set of respective line search constants is obtained. For example, the line search constants set (at least some or all of which are location dependent) $\alpha_1(x, y, z), \ldots \alpha_n(x, y, z)$ is obtained, with the final updates set being $\alpha_1(x, y, z)M_1 Grad, \ldots \alpha_n(x, y, z)M_n Grad$. At 330, the model update is combined from the local line searches masked in addition by the respective mask from masks set #1.

For example, the model update is combined from the local line searches with smoothly variable $\alpha^s(x, y, z)$, where the update is defined by $\Delta m = \alpha_1(x, y, z)M_1 Grad + \ldots + \alpha_n(x, y, z)M_n Grad$. In particular, outside of the overlap region (such as outside of lines 622, 624), the line search constants are not modified based on spatial location. Inside the overlap region (such as in between lines 622, 624), the line search constant may be interpolated/smoothed versions of as. For example, to the left of 622, $\alpha_1=1$ may be used, and to the right of 624, $\alpha_2=2$ may be used. In between lines $\tilde{\alpha}_1$ 622, $\tilde{\alpha}_2$ 624, there may be interpolated values between 1 and 2, to reduce discontinuities or scarring in the image. In this regard, in one implementation, all line search constants may be independent of location (see FIG. 2B). In an alternate implementation, some line search constants may be independent of location and other line search constants may be dependent on location (see FIG. 6C between lines $\tilde{\alpha}_1$ 622, $\tilde{\alpha}_2$ 624). In still another implementation, all line search constants may be dependent on location.

Further, in one implementation, the width of the transition region between different partitions, represented in FIG. 6C between lines 622, 624, may be predetermined and static. Alternatively, the width of the transition region between different partitions may be selected based on analysis of the image itself. For example, if the spatial frequency of the image indicates a lower frequency (meaning that events have a wider footprint), a wider transition region may be selected (e.g., 200 meter transition region). Conversely, if the spatial frequency of the image indicates a higher frequency (meaning that events have a narrower footprint), a narrower transition region may be selected (e.g., 100 meter transition region).

As discussed above, different partitions may be performed for the line searches versus for the search directions. For example, a first set of masks (such as masks for a partition of unity) may be used to partition the search direction and/or for updating the model, and a second set of masks (such as a set of masks that is extended) may be used for performing the line searches. Thus, in one implementation, different masks may be used for the line search versus for combining final update. Use of two subsets of mask may decrease mask imprint and unwanted scars.

Figure 4:
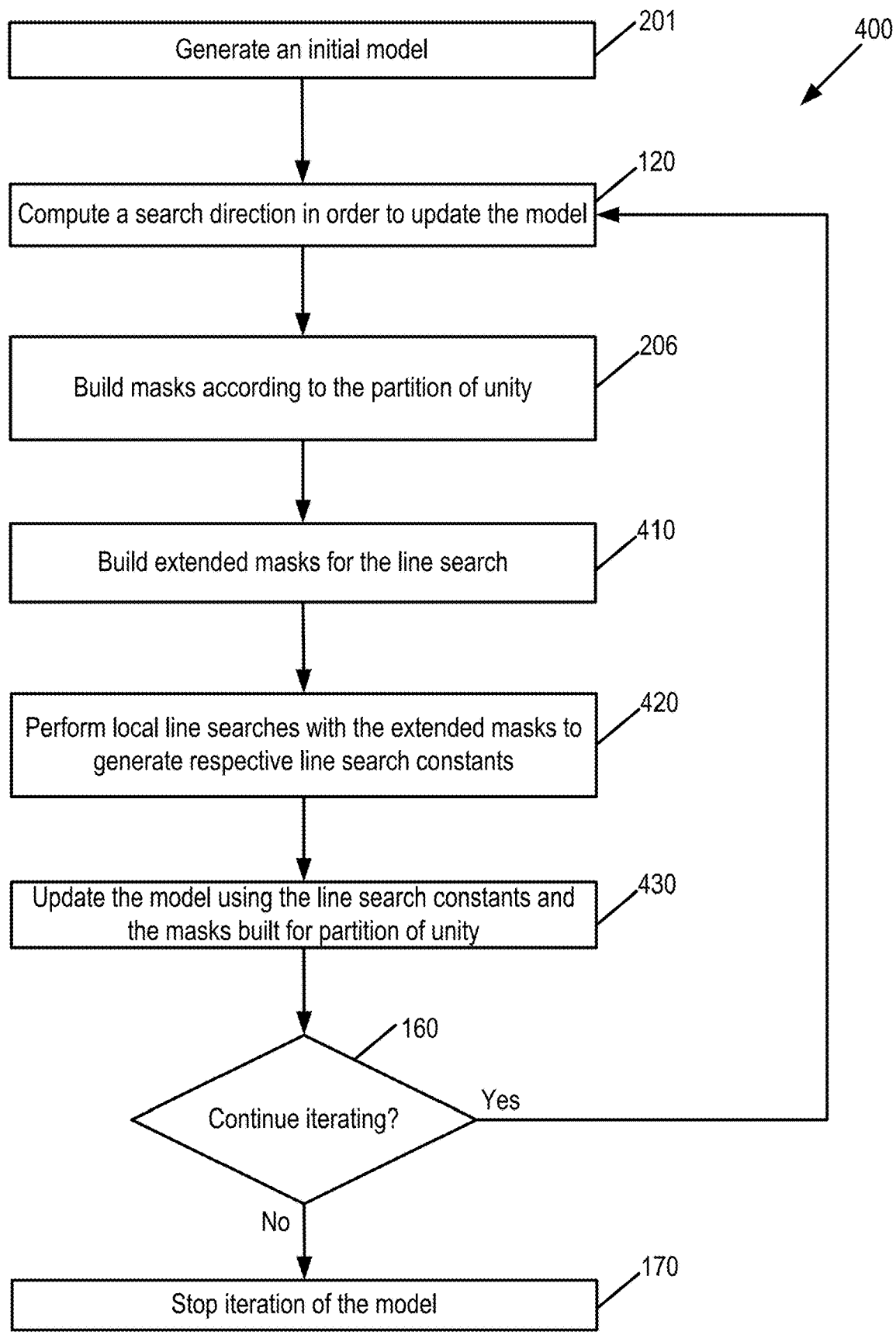
FIG. 4 illustrates a flow diagram for partitioning the search direction using masks and performing local line searches using extended masks.

FIG. 4 illustrates a flow diagram 400 for partitioning the search direction using masks and performing local line searches using extended masks. At 410, extended masks are built for the line search. At 420, the local line searches are performed with the extended masks in order to generate the respective line search constants. At 430, the model is updated with the respective line search constants and the masks for partition of unity.

As discussed above, in one implementation, the masks may divide the search direction so that each partition does not overlap. Merely for purposes of example, in a single direction, the partition may result in a first line search from 1 to 2.5 and a second line search from 2.5 to 4, which each having an interval of 1.5 and having a common boundary at 2.5. Alternatively, the masks may divide the search direction so that the partitions overlap. In the given example, the partition may result in a first line search from 1 to 3.5 and a second line search from 1.5 to 4, which each having an interval of 2.5 and without any common boundary. Thus, in effect, with the extended line searches, there may be reduced damage or potential scarring (separate from using a transition region between partitions). However, when adding the updates together, the interval of 2.5 is not used. Rather, the interval of 1.5, used for partition of unity such as at 430, is used.

Figure 5:
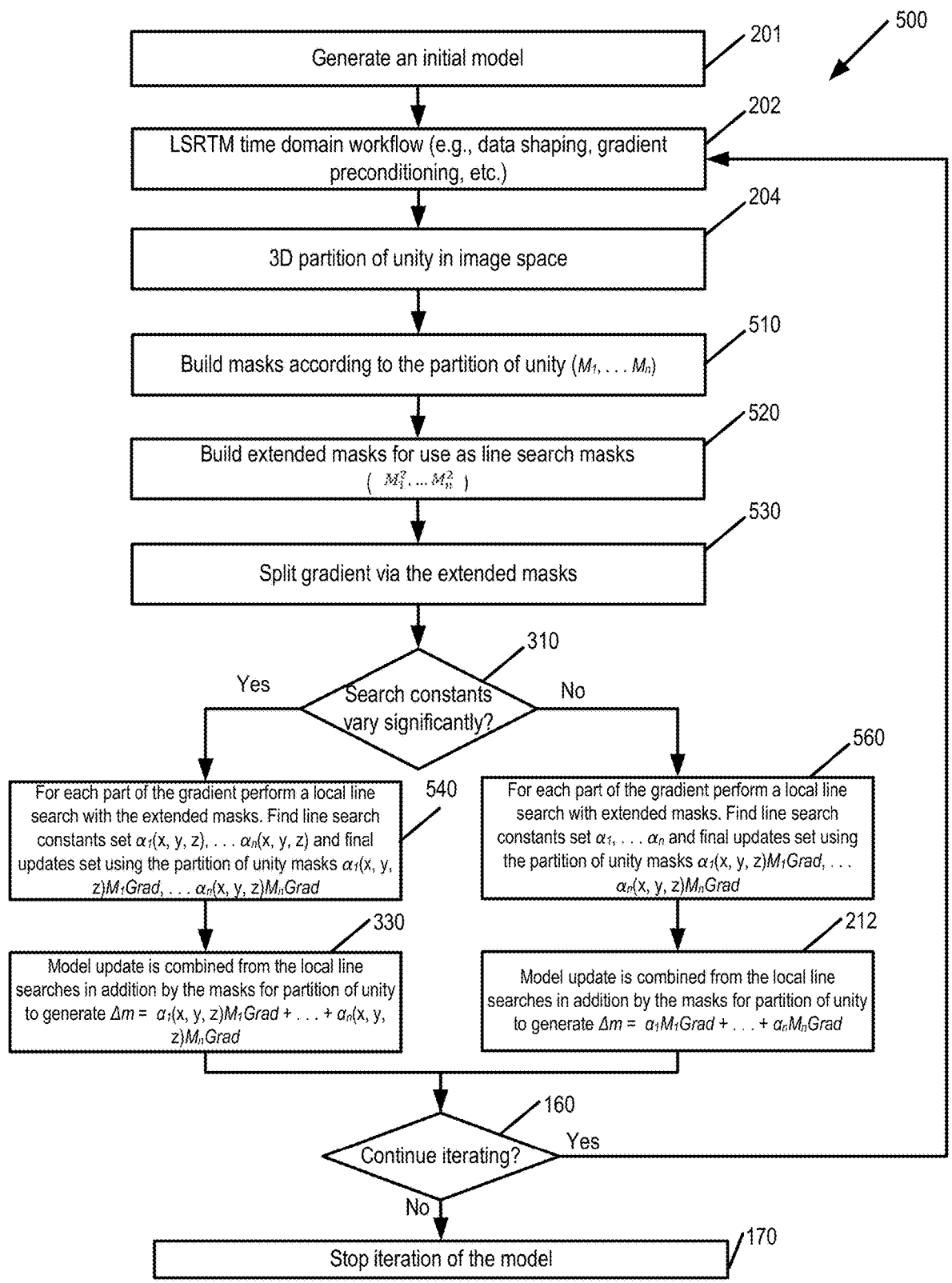
FIG. 5 illustrates a flow diagram of a fourth example flow diagram partitioning the gradient using masks and performing local line searches with extended masks in order to obtain different search constants, whereby the search constants are interpolated.
Figure 6D:
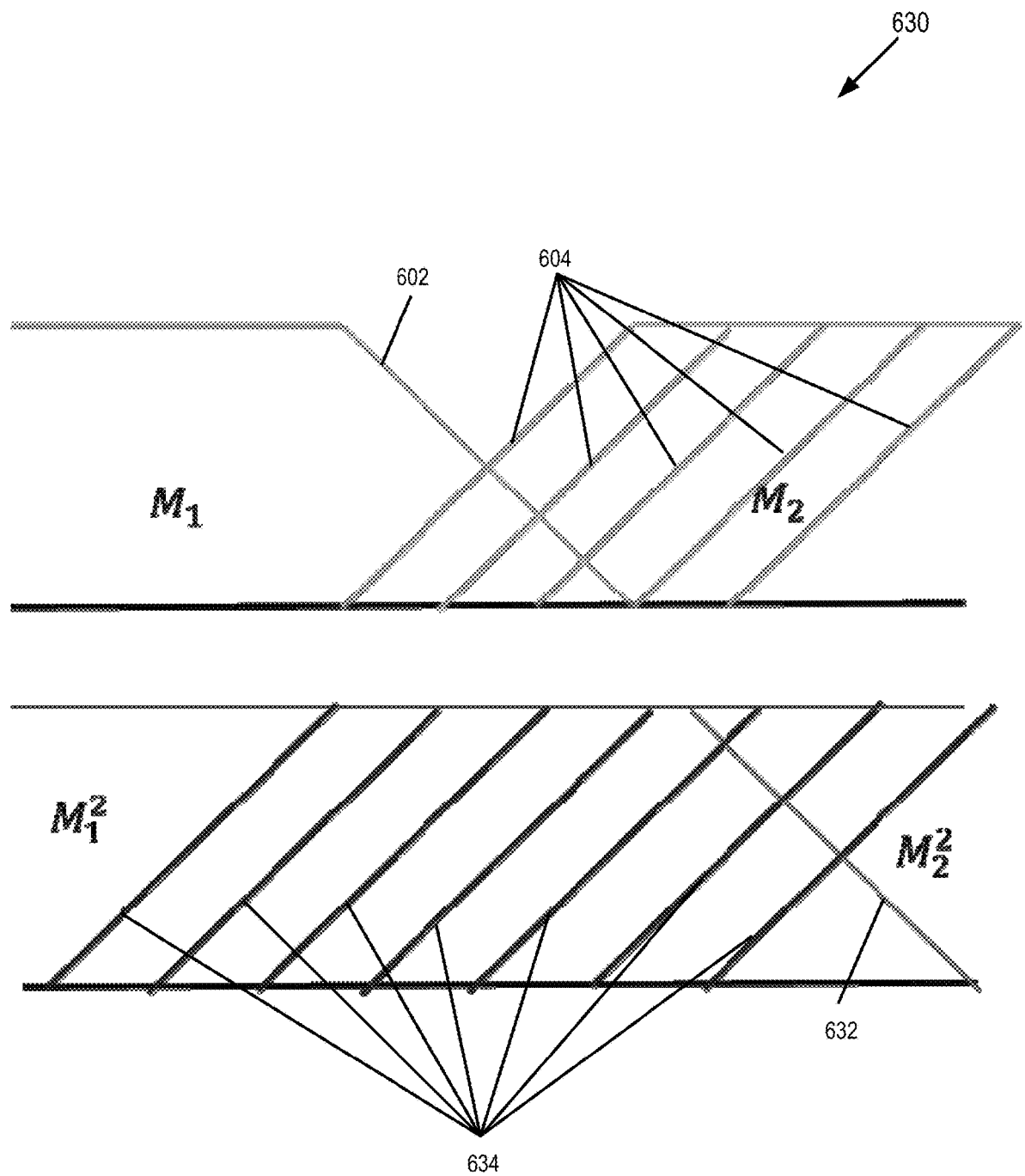
FIG. 6D shows an illustration of masks for partitioning the gradient (illustrated in FIG. 6A) and for performing the line search.

FIG. 5 illustrates a flow diagram 500 of a fourth example flow diagram partitioning the gradient using masks and performing local line searches with extended masks in order to obtain respective search constants, whereby the search constants are interpolated. At 510, the masks are built according to the partition of unity (e.g., $M_1, \ldots M_n$). Further, at 520, extended masks are built for use as line search masks (e.g., $M_1^2, \ldots M_n^2$). This is illustrated in FIG. 6D, which shows an illustration 630 of masks for partitioning the gradient (illustrated in FIG. 6A) and for performing the line search. In particular, FIG. 6D illustrates the extended masks for the line search update $M_1^2$ 632 and $M_2^2$ 634. As shown, the extended masks include the entirety of the respective masks for the partition of unity (e.g., $M_1^2$ 632 includes the entirety of $M_1$ 602 and an additional section or area not found in $M_1$ 602). At 530, the gradient is partitioned using the extended masks.

At 310, it is determined whether the search constants vary significantly. If not, at 560, for each part of the gradient, a local line search with extended masks is performed. Further, line search constants set $\alpha_1, \ldots \alpha_n$ are found and final updates are set using the partition of unity masks $\alpha_1(x, y, z)M_1\text{Grad}, \ldots \alpha_n(x, y, z)M_n\text{Grad}$. At 212, the model update is combined from the local line searches in addition by the masks for partition of unity to generate $\Delta m = \alpha_1 M_1 \text{Grad} + \ldots + \alpha_n M_n \text{Grad}$. If the search constants vary significantly, at 540, for each part of the gradient, a local line search with the extended masks is performed. The line search constants set $\alpha_1(x, y, z), \ldots \alpha_n(x, y, z)$ are found and final updates are set using the partition of unity masks $\alpha_1(x, y, z)M_1\text{Grad}, \ldots \alpha_n(x, y, z)M_n\text{Grad}$. At 330, the model update is combined from the local line searches in addition by the masks for partition of unity to generate $\Delta m = \alpha_1(x, y, z)M_1\text{Grad} + \ldots + \alpha_n(x, y, z)M_n\text{Grad}$.

As discussed above, separation into different subsets may be performed using masks. Alternatively, other ways may be used to split the gradient and still use separate line searches for these respective subdomains. For example, spatial frequency (e.g., dip of the reflectors) may be used to split gradient direction into different parts.

Figure 7A:
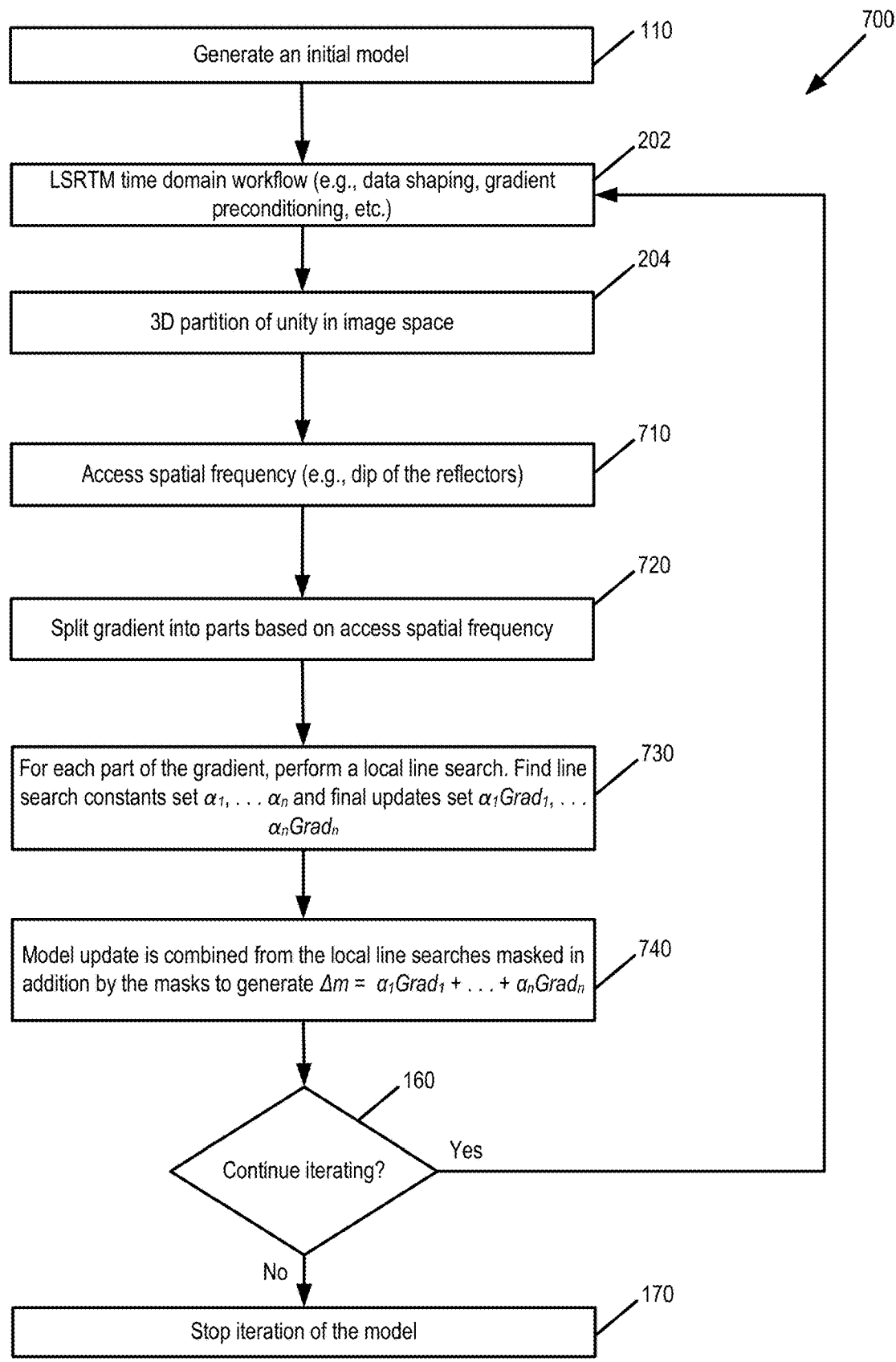
FIG. 7A illustrates a flow diagram for partitioning the search direction based on dip information and performing local line searches on the respective subdomains.
Figure 7B:
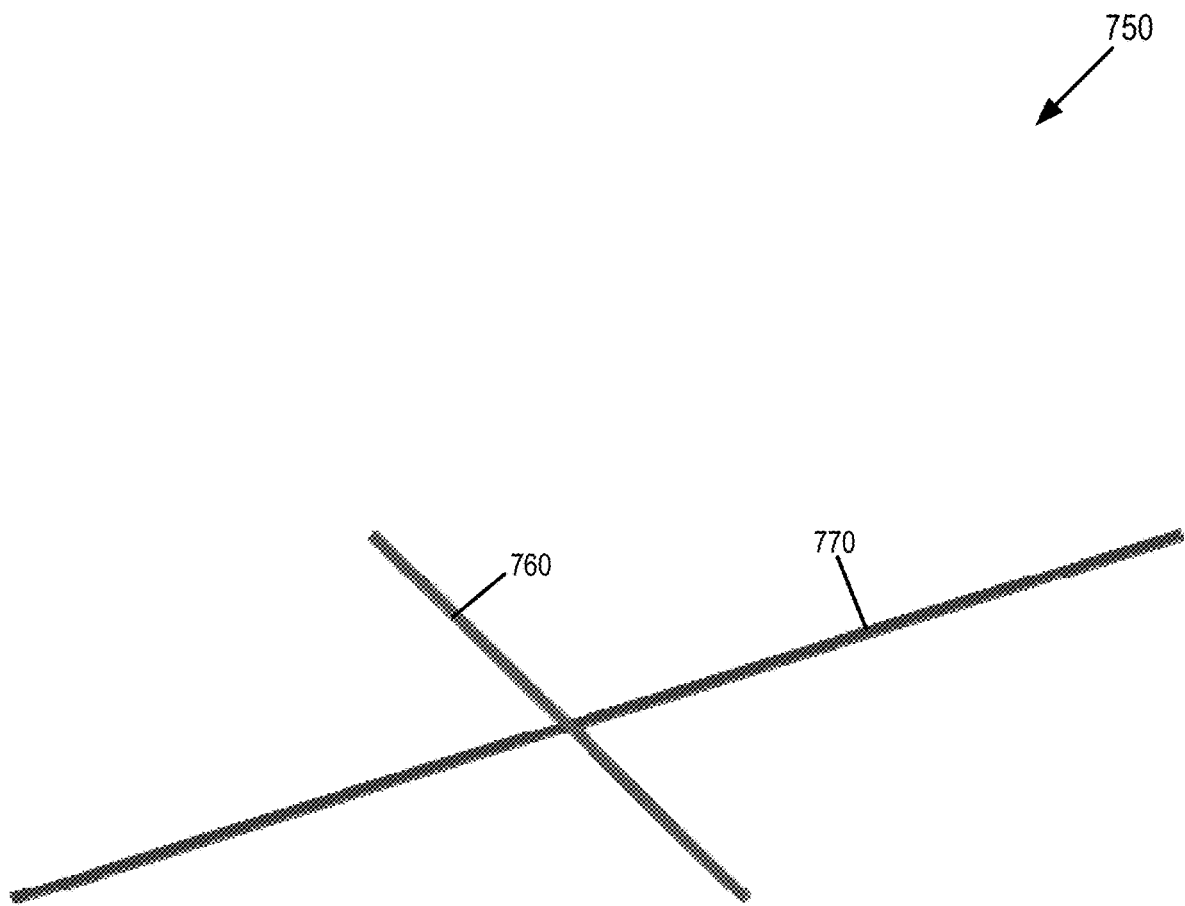
FIG. 7B shows an illustration of splitting a full gradient into separate pieces based on dip information.
Figure 8A:
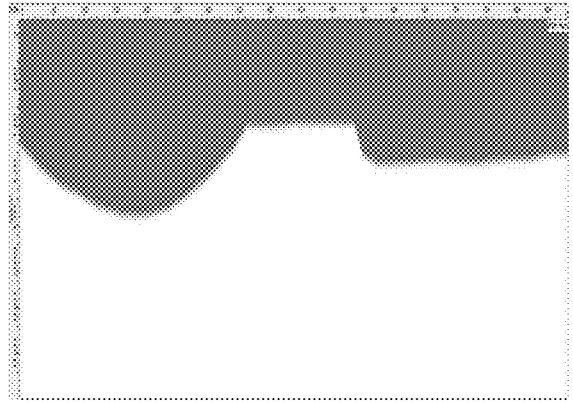
FIGS. 8A-D illustrate masks corresponding to the post-salt and sub-salt regions and corresponding masked parts of the gradient.
Figure 8C:
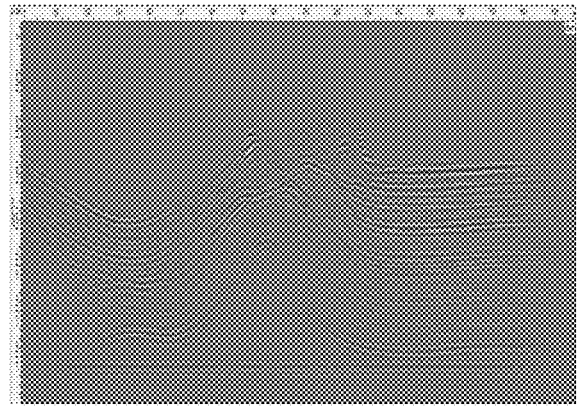
Figure 8B:
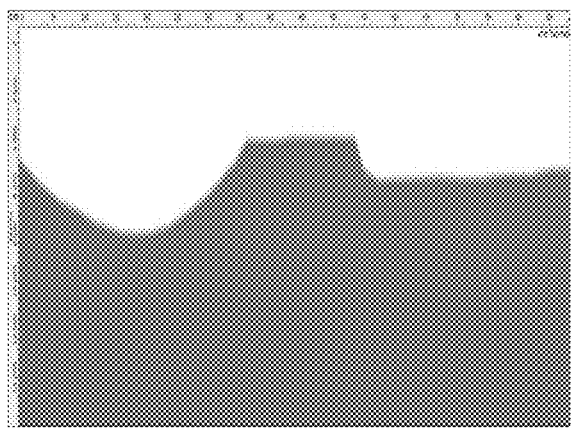
Figure 8D:
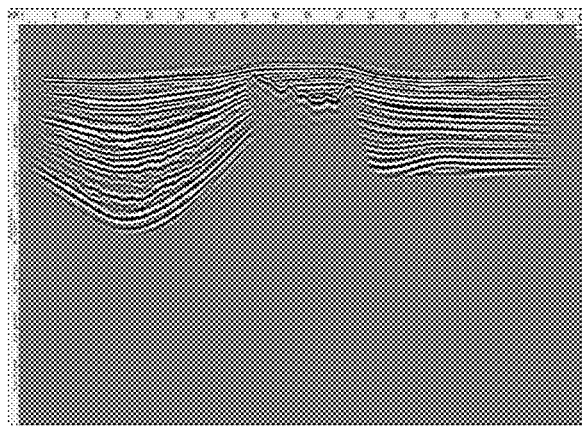

FIG. 7A illustrates a flow diagram 700 for partitioning the search direction based on dip information and performing local line searches on the respective subdomains. FIG. 7B shows an illustration 750 of splitting a full gradient into separate pieces 760, 770 based on dip information. At 710, the spatial frequency (e.g., dip in the reflectors) is accessed. At 720, the gradient is split based on the accessed spatial frequency. At 730, For each part of the gradient, a local line search is performed. The line search constants set $\alpha_1, \ldots \alpha_n$ are found and final updates are set to $\alpha_1\text{Grad}_1, \ldots \alpha_n\text{Grad}_n$. At 740, the model update is combined from the local line searches masked in addition by the masks to generate $\Delta m = \alpha_1\text{Grad}_1 + \ldots + \alpha_n\text{Grad}_n$.

FIGS. 8A-D illustrate masks corresponding to the post-salt and sub-salt regions and corresponding masked parts of the gradient. In particular, masks corresponding to the post-salt and sub-salt regions and corresponding masked parts of the gradient are illustrated in FIGS. 8A-D. As shown, the parts are unbalanced even after preconditioning. In particular, FIGS. 8A-D illustrate results of the model update while using two independent line searches. If no masks are used, the update is meaningfully concentrated on the post-salt region, which may lead to at least one extra iteration.

Figure 9:
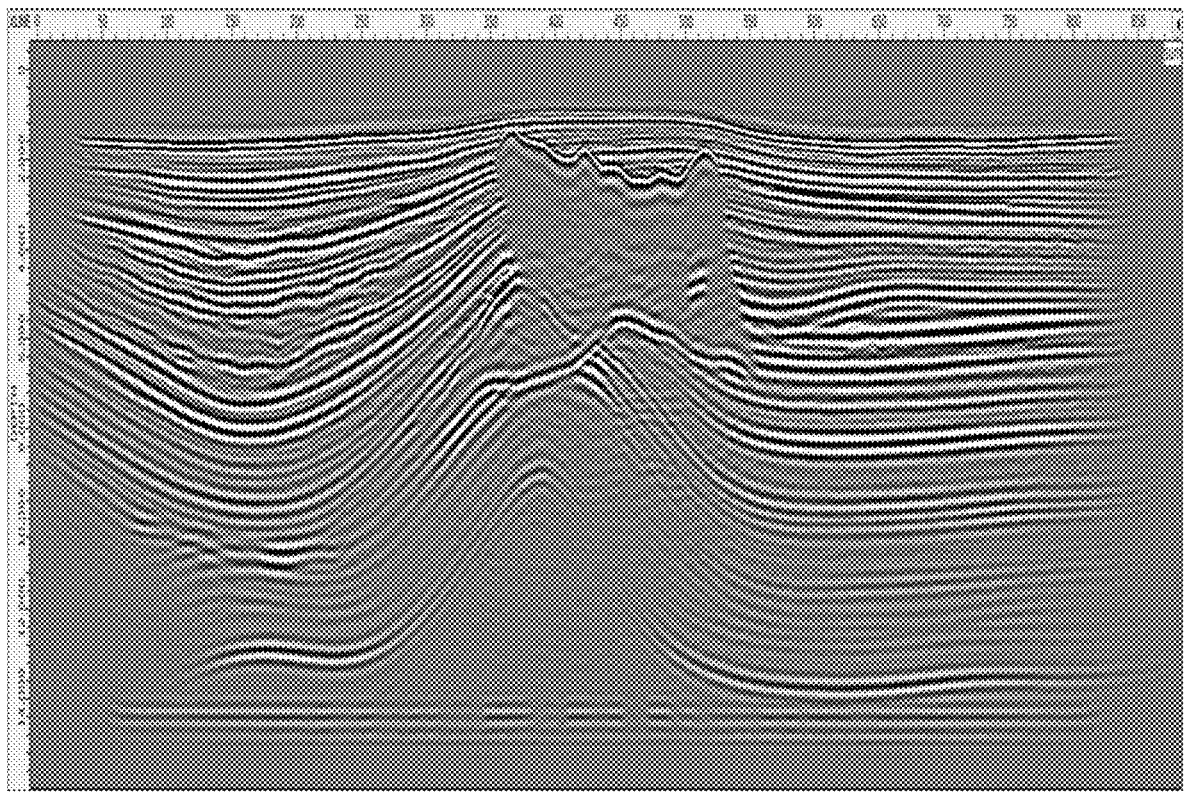
FIG. 9 illustrates an LSRTM image combined from the two different Line Searches corresponding to the post-salt and sub-salt regions and corresponding masked parts of the gradient illustrated in FIGS. 8A-D.

FIG. 9 illustrates an LSRTM image combined from the two different line searches corresponding to the post-salt and sub-salt regions and corresponding masked parts of the gradient illustrated in FIGS. 8A-D.

Figure 10:
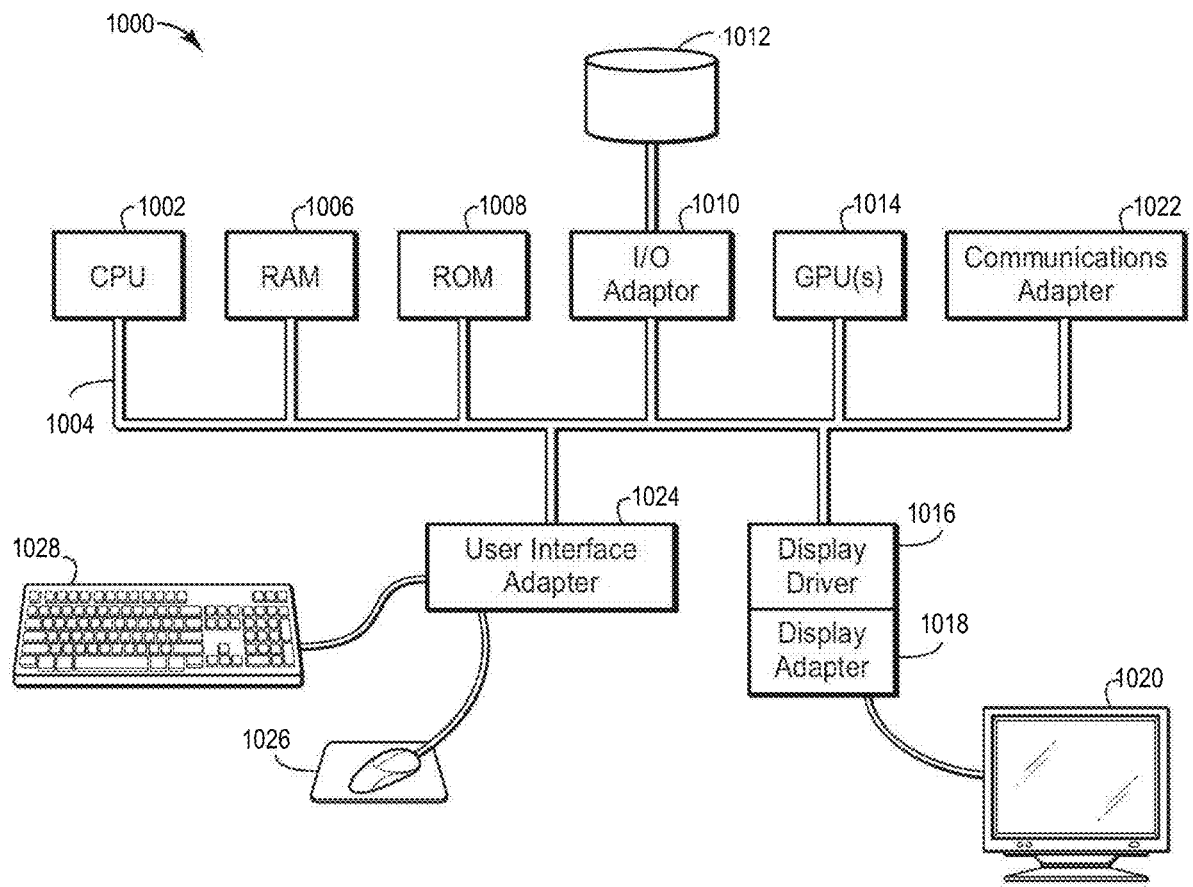
FIG. 10 is a diagram of an exemplary computer system that may be utilized to implement the methods described herein.
Figure 11A:
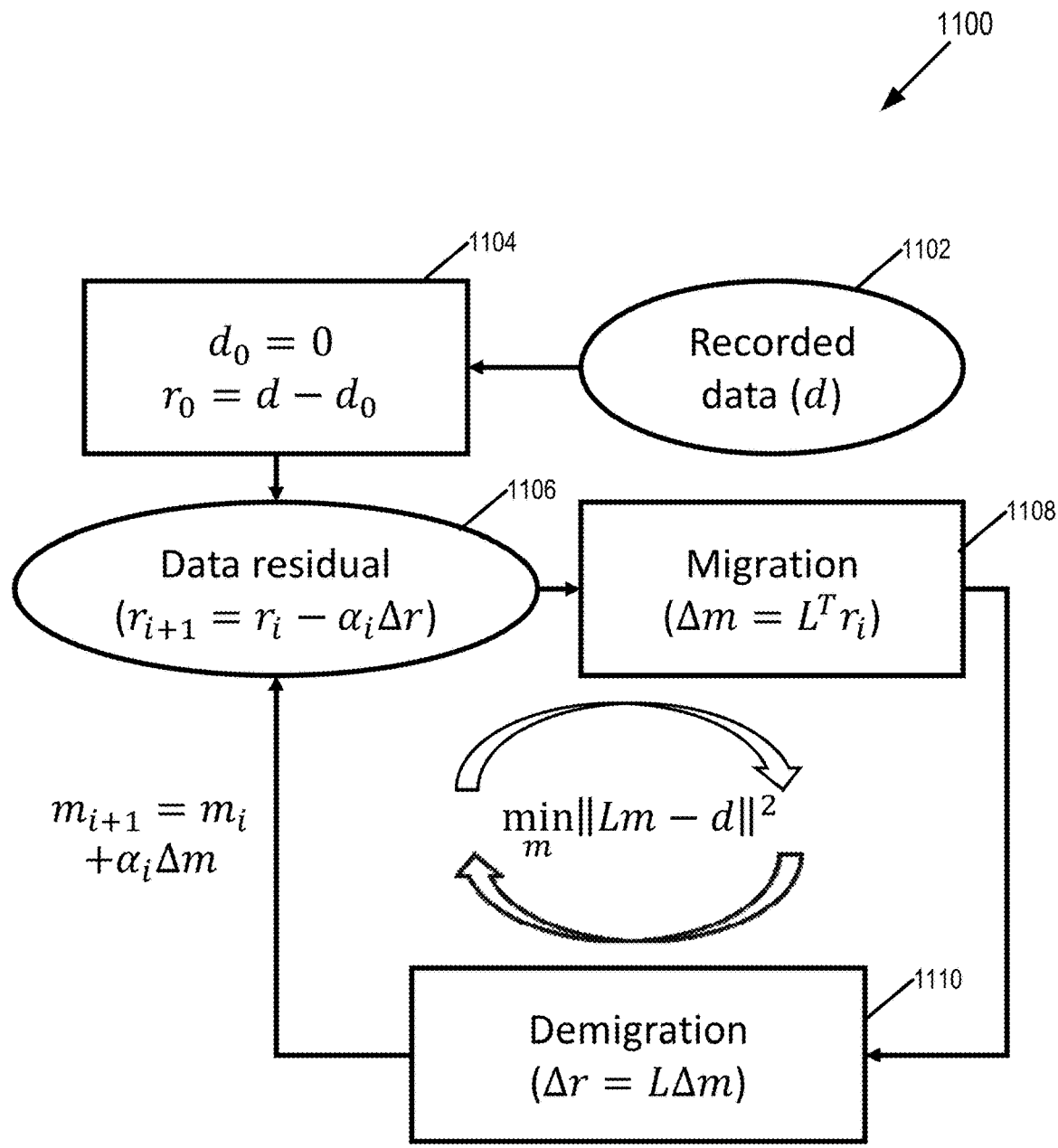
FIG. 11A is a flow diagram for DD LSRTM.
Figure 11B:
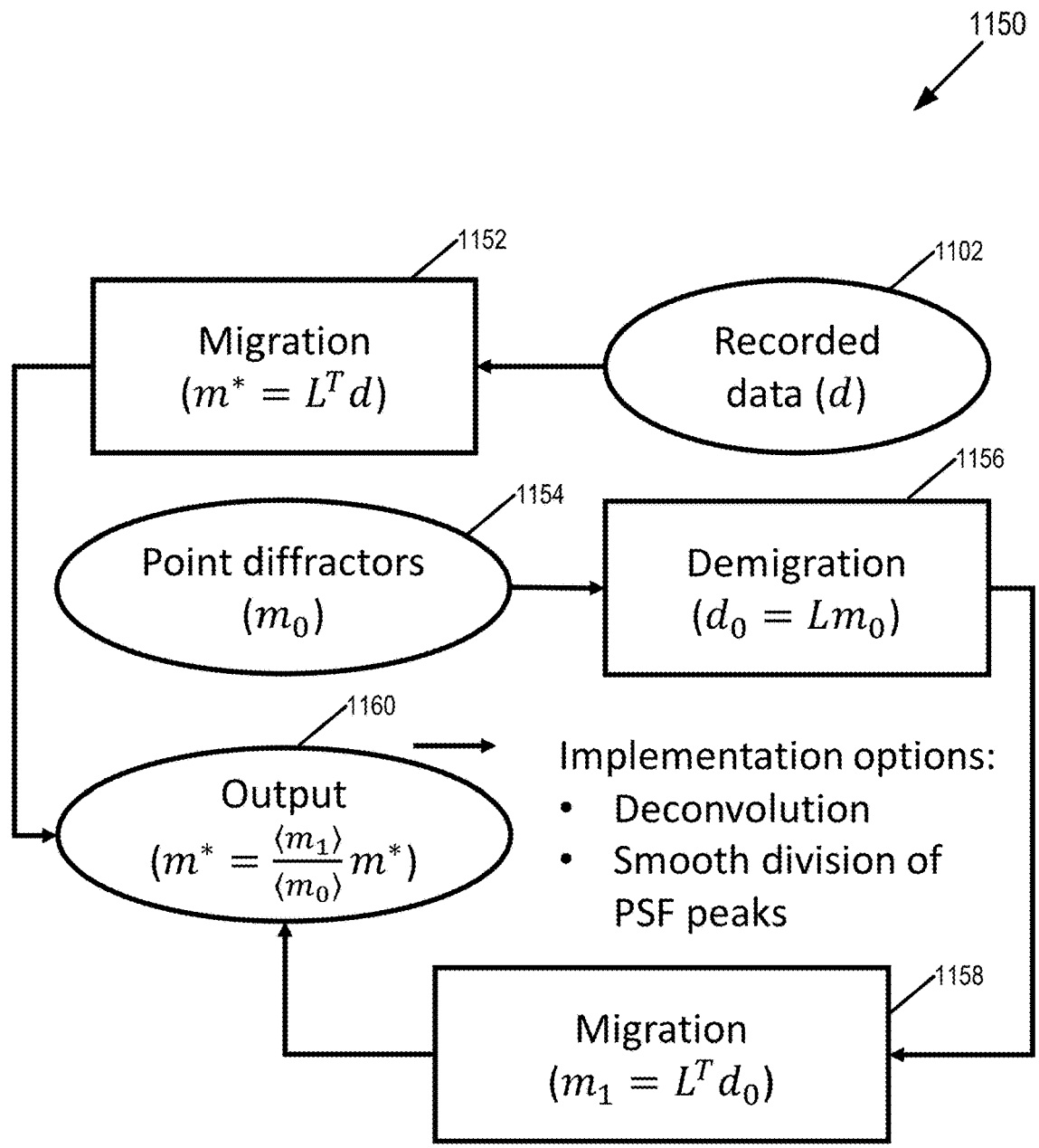
FIG. 11B is a flow diagram of a single iteration ID LSRTM.

In all practical applications, the present technological advancement must be used in conjunction with a computer, programmed in accordance with the disclosures herein. For example, FIG. 10 is a diagram of an exemplary computer system 1000 that may be utilized to implement methods described herein. A central processing unit (CPU) 1002 is coupled to system bus 1004. The CPU 1002 may be any general-purpose CPU, although other types of architectures of CPU 1002 (or other components of exemplary computer system 1000) may be used as long as CPU 1002 (and other components of computer system 1000) supports the operations as described herein. Those of ordinary skill in the art will appreciate that, while only a single CPU 1002 is shown in FIG. 10, additional CPUs may be present. Moreover, the computer system 1000 may comprise a networked, multi-processor computer system that may include a hybrid parallel CPU/GPU system. The CPU 1002 may execute the various logical instructions according to various teachings disclosed herein. For example, the CPU 1002 may execute machine-level instructions for performing processing according to the operational flow described.

The computer system 1000 may also include computer components such as non-transitory, computer-readable media. Examples of computer-readable media include a random access memory (RAM) 1006, which may be SRAM, DRAM, SDRAM, or the like. The computer system 1000 may also include additional non-transitory, computer-readable media such as a read-only memory (ROM) 1008, which may be PROM, EPROM, EEPROM, or the like. RAM 1006 and ROM 1008 hold user and system data and programs, as is known in the art. The computer system 1000 may also include an input/output (I/O) adapter 1010, a graphics processing unit (GPU) 1014, a communications adapter 1022, a user interface adapter 1024, a display driver 1016, and a display adapter 1018.

The I/O adapter 1010 may connect additional non-transitory, computer-readable media such as storage device(s) 1012, including, for example, a hard drive, a compact disc (CD) drive, a floppy disk drive, a tape drive, and the like to computer system 1000. The storage device(s) may be used when RAM 1006 is insufficient for the memory requirements associated with storing data for operations of the present techniques. The data storage of the computer system 1000 may be used for storing information and/or other data used or generated as disclosed herein. For example, storage device(s) 1012 may be used to store configuration information or additional plug-ins in accordance with the present techniques. Further, user interface adapter 1024 couples user input devices, such as a keyboard 1028, a pointing device 1026 and/or output devices to the computer system 1000. The display adapter 1018 is driven by the CPU 1002 to control the display on a display device 1020 to, for example, present information to the user such as subsurface images generated according to methods described herein.

The architecture of computer system 1000 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1000 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

The following example embodiments of the invention are also disclosed:

Embodiment 1

A method comprising:
  computing, using at least one computer and a subsurface property model, an objective function measuring misfit between model-simulated data and measured geophysical data;
  computing, using the at least one computer, a search direction in order to update the model;
  partitioning the search direction;
  performing multiple line searches for the partitioned search direction in order to generate respective line search constants; and
  updating the model using the partitioned search direction and the respective line search constants.

Embodiment 2

The method of embodiment 1,
  wherein the search direction comprises a gradient.

Embodiment 3

The method of any of embodiments 1 and 2,
  wherein the model is updated using least squares reverse time migration.

Embodiment 4

The method of any of embodiments 1-3,
  wherein partitioning the search direction comprises:
  introducing a 3D partition of unity in image space;
  generating masks corresponding to the 3D partition of unity; and
  partitioning the gradient using the masks.

Embodiment 5

The method of any of embodiments 1-4,
  wherein generating masks corresponding to the 3D partition of unity comprises $M_1$ to $M_n$, where n is greater than 1; and
  wherein partitioning the gradient (Grad) using the masks comprises splitting the gradient via the masks to generate $M_1$Grad to $M_n$Grad.

Embodiment 6

The method of any of embodiments 1-5,
  wherein the respective line search constants generated by the multiple line searches comprise $\alpha_1$ to $\alpha_n$; and
  wherein the model update comprises $\Delta m = \alpha_1 M_1 \text{Grad}$ to $\alpha_n M_n \text{Grad}$.

Embodiment 7

The method of any of embodiments 1-6,
  wherein the line search constants are selected independently of one another.

Embodiment 8

The method of any of embodiments 1-6,
  wherein the line search constants are selected at least partly dependently on one another.

Embodiment 9

The method of any of embodiments 1-6 and 8,
  wherein at least some of the line search constants are smoothed based on other line search constants in proximity thereto.

Embodiment 10

The method of any of embodiments 1-9,
wherein a first set of masks are used to partition the gradient;
wherein a second set of masks are used to perform the multiple line searches; and
wherein the first set of masks is different from the second set of masks.

Embodiment 11

The method of any of embodiments 1-10,
wherein the second set of masks are wider than the first set of masks.

Embodiment 12

The method of any of embodiments 1-11,
wherein the second set of masks includes an entirety of the first set of masks and additional area.

Embodiment 13

The method of any of embodiments 1-12,
wherein a same set of masks are used to partition the gradient and to perform the multiple line searches.

Embodiment 14

The method of any of embodiments 1-13,
wherein partitioning the search direction is based on at least one of spatial frequency or masks.

Embodiment 15

The method of any of embodiments 1-14,
wherein partitioning the search direction is based on both spatial frequency and masks.

Embodiment 16

The method of any of embodiments 1-15,
further comprising dynamically determining a number of partitions for the search direction; and
wherein partitioning the search direction is in the number of partitions.

Embodiment 17

The method of any of embodiments 1-16,
wherein dynamically determining the number of partitions for the search direction is based on analysis of a number of events in an image generating by the model.

Embodiment 18

The method of any of embodiments 1-17,
wherein the model is updated iteratively; and
wherein the number of partitions for the search direction remains constant for the iterations of the model.

Embodiment 19

The method of any of embodiments 1-17,
wherein the model is updated iteratively; and
wherein the number of partitions for the search direction changes for the iterations of the model.

Embodiment 20

The method of any of embodiments 1-19,
wherein updating the model comprises a Born-approximation based implementation of tomographically enhanced full wavefield inversion.

Embodiment 21

The method of any of embodiments 1-20,
wherein a full wavefield inversion (FWI) operation comprises a first inversion and a second inversion;
wherein the first inversion includes a linear objective function;
wherein the second inversion includes a non-linear objective function;
wherein partitioning the search direction and performing multiple line searches for the partitioned search direction is performed for the linear objective function; and
wherein a single line search for an unpartitioned search direction is performed for the non-linear objective function.

REFERENCES

The following references are hereby incorporated by reference herein in their entirety:
Gerard T. Schuster, Seismic inversion, Investigations in Geophysics No. 20, ISBN-13: 978-1560803416 (2017).
Jonathan R. Shewchuk, An introduction to the Conjugate Gradient Method Without the Agonizing Pain Edition 1¼, School of Computer Science Carnegie Mellon University Pittsburgh, Pa. (Aug. 4, 1994).
U.S. Pat. No. 9,671,512.
U.S. Pat. No. 9,772,413.
US Patent Application Publication No. 2017/0176613.
US Patent Application Publication No. 2018/0045839.

The invention claimed is:

1. A method of hydrocarbon prospecting, comprising:
computing, using a subsurface property model, an objective function measuring misfit between model-simulated data and measured geophysical data;
computing a search direction comprising a gradient in order to update the model;
partitioning the search direction, wherein partitioning the search direction comprises:
introducing a 3D partition of unity in image space; and
partitioning the gradient corresponding to the 3D partition of unity;
performing multiple line searches for the partitioned search direction in order to generate respective line search constants;
updating the model using the partitioned search direction and the respective line search constants; and
identifying potential hydrocarbon-bearing formations in a subsurface region with data from the updated model.

2. The method of claim 1, wherein the model is updated using least squares reverse time migration.

3. The method of claim 1, wherein partitioning the search direction is based on at least one of spatial frequency or masks.

4. The method of claim 1, further comprising dynamically determining a number of partitions for the search direction; and
wherein partitioning the search direction is in the number of partitions.

5. The method of claim 4, wherein dynamically determining the number of partitions for the search direction is based on analysis of a number of events in an image generated by the model.

6. The method of claim 5, wherein the model is updated iteratively; and
wherein the number of partitions for the search direction remains constant for the iterations of the model.

7. The method of claim 5, wherein the model is updated iteratively; and
wherein the number of partitions for the search direction changes for the iterations of the model.

8. The method of claim 1, wherein updating the model comprises a Born-approximation based implementation of tomographically enhanced full wavefield inversion, wherein the Born-approximation uses a linearized Earth model.

9. The method of claim 1, wherein a full wavefield inversion (FWI) operation comprises a first inversion and a second inversion;
wherein the first inversion includes a linear objective function;
wherein the second inversion includes a non-linear objective function;
wherein partitioning the search direction and performing multiple line searches for the partitioned search direction is performed for the linear objective function; and
wherein a single line search for an unpartitioned search direction is performed for the non-linear objective function.

10. A method of hydrocarbon prospecting, comprising:
computing, using a subsurface property model, an objective function measuring misfit between model-simulated data and measured geophysical data;
computing a search direction comprising a gradient in order to update the model;
partitioning the search direction, wherein partitioning the search direction comprises:
introducing a 3D partition of unity in image space;
generating masks corresponding to the 3D partition of unity; and
partitioning the gradient using the masks;
performing multiple line searches for the partitioned search direction in order to generate respective line search constants;
updating the model using the partitioned search direction and the respective line search constants, and using least squares reverse time migration; and
identifying potential hydrocarbon-bearing formations in a subsurface region with data from the updated model.

11. The method of claim 10, wherein generating masks corresponding to the 3D partition of unity comprises $M_1$ to $M_n$, where n is greater than 1; and
wherein partitioning the gradient (Grad) using the masks comprises splitting the gradient via the masks to generate $M_1$Grad to $M_1$Grad.

12. The method of claim 11, wherein the respective line search constants generated by the multiple line searches comprise $\alpha_1$ to $\alpha_n$; and
wherein the model update comprises $\Delta m = \alpha_1 M_1 \text{Grad}$ to $\alpha_n M_n \text{Grad}$.

13. The method of claim 12, wherein the respective line search constants are selected independently of one another.

14. The method of claim 12, wherein the respective line search constants are selected at least partly dependently on one another.

15. The method of claim 14, wherein at least some of the respective line search constants are smoothed based on other line search constants in proximity thereto.

16. The method of claim 10, wherein a first set of masks are used to partition the gradient;
wherein a second set of masks are used to perform the multiple line searches; and
wherein the first set of masks is different from the second set of masks.

17. The method of claim 16, wherein the second set of masks are wider than the first set of masks.

18. The method of claim 17, wherein the second set of masks includes an entirety of the first set of masks and additional area.

19. The method of claim 10, wherein a same set of masks are used to partition the gradient and to perform the multiple line searches.

* * * * *